United States Patent
Mahlmeister et al.

(10) Patent No.: US 12,201,898 B2
(45) Date of Patent: Jan. 21, 2025

(54) GAMING ACCESSORY WITH SENSORY FEEDBACK DEVICE

(71) Applicant: STEELSERIES ApS, Copenhagen SV (DK)

(72) Inventors: Jeffrey Nicholas Mahlmeister, Glenview, IL (US); Bruce Hawver, Hawthorn Woods, IL (US); Jacob Wolff-Petersen, Richmond (GB); Kim Rom, San Francisco, CA (US); Francis Arnold Grever, Palatine, IL (US); Tino Soelberg, Chicago, IL (US)

(73) Assignee: STEELSERIES ApS, Copenhagen (DK)

( * ) Notice: Subject to any disclaimer, the term of this patent is extended or adjusted under 35 U.S.C. 154(b) by 0 days.

(21) Appl. No.: 18/163,558

(22) Filed: Feb. 2, 2023

(65) Prior Publication Data

US 2023/0173381 A1 Jun. 8, 2023

Related U.S. Application Data

(63) Continuation of application No. 17/511,213, filed on Oct. 26, 2021, now Pat. No. 11,590,418, which is a
(Continued)

(51) Int. Cl.
*G06F 3/0354* (2013.01)
*A63F 13/211* (2014.01)
(Continued)

(52) U.S. Cl.
CPC .......... *A63F 13/285* (2014.09); *A63F 13/211* (2014.09); *A63F 13/213* (2014.09);
(Continued)

(58) Field of Classification Search
CPC .... A63F 13/285; A63F 13/211; A63F 13/213; A63F 13/214; A63F 13/22; A63F 13/42;
(Continued)

(56) References Cited

U.S. PATENT DOCUMENTS 5,207,426 A  5/1993  Inoue et al.
5,643,087 A  7/1997  Marcus et al.
(Continued)

FOREIGN PATENT DOCUMENTS

DE  102010030974 A1  3/2011
GB  2434228  7/2007
(Continued)

OTHER PUBLICATIONS

Ideazon Merc Stealth Illuminated Gaming Keyboard Review, Jan. 31, 2008. Available on the internet in Feb. 2009 under the URL https://web.archive.org/web/20090210152018/http://overclockersclub.com/reviews/ideazon_merc_stealth_illuminated_gaming_keyboard.
(Continued)

*Primary Examiner* — Adam R. Giesy
(74) *Attorney, Agent, or Firm* — Guntin & Gust, PLC; John G. Ranch

(57) ABSTRACT

A method that incorporates teachings of the subject disclosure may include, for example, receiving, by a device comprising a processor, a first signal from a motion-sensitive component of the device; receiving, by the device, a second signal from a touch-sensitive interface of the device, detecting, by the device, from a combined signal comprising the first signal and the second signal, a selection of a portion of the device; and causing, by the device, a sensory feedback generator to provide a feedback signal in accordance with the combined signal. The feedback signal may comprise an
(Continued)

audible sound, a visual effect, a tactile effect, or any combination thereof. Additional embodiments are disclosed.

20 Claims, 19 Drawing Sheets

Related U.S. Application Data continuation of application No. 17/118,906, filed on Dec. 11, 2020, now Pat. No. 11,224,802, which is a continuation of application No. 16/666,900, filed on Oct. 29, 2019, now Pat. No. 10,898,799, which is a continuation of application No. 16/202,934, filed on Nov. 28, 2018, now Pat. No. 10,500,489, which is a continuation of application No. 15/222,358, filed on Jul. 28, 2016, now Pat. No. 10,173,133, which is a continuation of application No. 13/957,493, filed on Aug. 2, 2013, now Pat. No. 9,423,874.

(60) Provisional application No. 61/792,519, filed on Mar. 15, 2013.

(51) Int. Cl.
*A63F 13/213* (2014.01)
*A63F 13/214* (2014.01)
*A63F 13/22* (2014.01)
*A63F 13/285* (2014.01)
*A63F 13/42* (2014.01)
*G06F 3/01* (2006.01)

(52) U.S. Cl.
CPC ............ *A63F 13/214* (2014.09); *A63F 13/22* (2014.09); *A63F 13/42* (2014.09); *G06F 3/016* (2013.01); *G06F 3/03543* (2013.01); *G06F 3/03547* (2013.01); *A63F 2300/1068* (2013.01)

(58) Field of Classification Search
CPC ............ A63F 2300/1068; G06F 3/016; G06F 3/03543; G06F 3/03547
See application file for complete search history.

(56) References Cited

U.S. PATENT DOCUMENTS

| | | |
|---|---|---|
| D387,094 S | 12/1997 | Muraki et al. |
| 5,785,317 A | 7/1998 | Sasaki |
| D411,839 S | 7/1999 | Au Yeung |
| 5,923,317 A | 7/1999 | Sayler et al. |
| 6,071,194 A | 6/2000 | Sanderson |
| 6,348,911 B1 | 2/2002 | Rosenberg et al. |
| D487,466 S | 3/2004 | Yokota |
| 6,743,100 B1 | 6/2004 | Neiser |
| 6,932,341 B1 | 8/2005 | Kenyon |
| 7,002,702 B1 | 2/2006 | Machida |
| 7,149,978 B1 | 12/2006 | Maffezzoni |
| D568,883 S | 5/2008 | Ashida et al. |
| D570,349 S | 6/2008 | Ashida et al. |
| 7,383,327 B1 | 6/2008 | Tormasov |
| D585,931 S | 2/2009 | Palmer |
| 8,063,893 B2 | 11/2011 | Rosenberg et al. |
| 8,143,982 B1 | 3/2012 | Lauder et al. |
| 8,212,772 B2 | 7/2012 | Shahoian |
| 8,264,310 B2 | 9/2012 | Lauder et al. |
| 8,264,465 B2 | 9/2012 | Grant et al. |
| 8,313,379 B2 | 11/2012 | Ikeda et al. |
| 8,378,979 B2 | 2/2013 | Frid et al. |
| 8,418,085 B2 | 4/2013 | Snook et al. |
| 8,436,821 B1 | 5/2013 | Plichta et al. |
| D697,140 S | 1/2014 | Baum |
| 8,638,190 B1 | 1/2014 | Want et al. |
| 8,660,342 B2 | 2/2014 | Obrador et al. |
| 8,855,966 B2 | 10/2014 | Zhang et al. |
| 8,867,013 B2 | 10/2014 | Krishnakumar et al. |
| 8,913,021 B2 | 12/2014 | Hotelling et al. |
| 9,389,690 B2 | 7/2016 | Li et al. |
| 9,409,087 B2 | 8/2016 | Soelberg, III et al. |
| 9,452,350 B1 | 9/2016 | Henrick |
| 9,687,730 B2 | 6/2017 | Mahlmeister et al. |
| 9,737,796 B2 | 8/2017 | Soelberg |
| 9,990,111 B2 | 6/2018 | Tan |
| 10,076,706 B2 | 9/2018 | Mahlmeister et al. |
| 10,350,494 B2 | 7/2019 | Mahlmeister et al. |
| 10,525,338 B2 | 1/2020 | Soelberg |
| 11,135,510 B2 | 10/2021 | Mahlmeister et al. |
| 11,701,585 B2 | 7/2023 | Mahlmeister et al. |
| 2001/0003713 A1 | 6/2001 | Willner et al. |
| 2001/0011995 A1 | 8/2001 | Hinckley et al. |
| 2001/0015718 A1 | 8/2001 | Hinckley et al. |
| 2002/0006222 A1 | 1/2002 | Inagaki et al. |
| 2002/0052230 A1 | 5/2002 | Martinek et al. |
| 2003/0063779 A1 | 4/2003 | Wrigley |
| 2003/0220142 A1 | 11/2003 | Siegel et al. |
| 2004/0104894 A1 | 6/2004 | Tsukada et al. |
| 2004/0166940 A1 | 8/2004 | Rothschild |
| 2004/0193441 A1 | 9/2004 | Altieri |
| 2004/0219976 A1 | 11/2004 | Campbell et al. |
| 2004/0229687 A1 | 11/2004 | Miyamoto et al. |
| 2004/0261026 A1 | 12/2004 | Corson |
| 2005/0035945 A1 | 2/2005 | Keenan et al. |
| 2005/0049841 A1 | 3/2005 | Chen et al. |
| 2005/0183143 A1 | 8/2005 | Anderholm et al. |
| 2005/0210417 A1 | 9/2005 | Marvit et al. |
| 2005/0215319 A1 | 9/2005 | Rigopulos et al. |
| 2005/0225530 A1 | 10/2005 | Evans et al. |
| 2005/0239523 A1 | 10/2005 | Longman et al. |
| 2006/0046804 A1 | 3/2006 | Schultz et al. |
| 2006/0119586 A1 | 6/2006 | Grant et al. |
| 2006/0121990 A1 | 6/2006 | O'Kelley et al. |
| 2006/0142979 A1 | 6/2006 | Imai |
| 2006/0148578 A1 | 7/2006 | Hayes et al. |
| 2006/0152489 A1 | 7/2006 | Sweetser et al. |
| 2006/0152495 A1 | 7/2006 | Gombert et al. |
| 2006/0166620 A1 | 7/2006 | Sorensen |
| 2006/0178212 A1 | 8/2006 | Penzias |
| 2006/0190270 A1 | 8/2006 | Luisi |
| 2006/0211471 A1 | 9/2006 | Walker et al. |
| 2006/0211494 A1 | 9/2006 | Helfer et al. |
| 2006/0246969 A1 | 11/2006 | Penello et al. |
| 2006/0258464 A1 | 11/2006 | Kawanobe et al. |
| 2006/0287098 A1 | 12/2006 | Morrow et al. |
| 2007/0026935 A1 | 2/2007 | Wolf et al. |
| 2007/0045951 A1 | 3/2007 | Robertson et al. |
| 2007/0080934 A1 | 4/2007 | Chen et al. |
| 2007/0123390 A1 | 5/2007 | Mathis |
| 2007/0149288 A1 | 6/2007 | Nickell et al. |
| 2007/0180407 A1 | 8/2007 | Vahtola |
| 2007/0218965 A1 | 9/2007 | Tilston et al. |
| 2007/0259716 A1 | 11/2007 | Mattice et al. |
| 2008/0168403 A1 | 7/2008 | Westerman et al. |
| 2008/0174550 A1 | 7/2008 | Laurila et al. |
| 2008/0214305 A1 | 9/2008 | Addington et al. |
| 2008/0221885 A1 | 9/2008 | Lin |
| 2008/0225041 A1 | 9/2008 | El Dokor et al. |
| 2009/0054146 A1 | 2/2009 | Epstein et al. |
| 2009/0085877 A1 | 4/2009 | Chang et al. |
| 2009/0124350 A1 | 5/2009 | Iddings et al. |
| 2009/0124387 A1 | 5/2009 | Perlman et al. |
| 2009/0131165 A1 | 5/2009 | Buchner et al. |
| 2009/0143128 A1 | 6/2009 | Cautley et al. |
| 2009/0144621 A1 | 6/2009 | Sangster et al. |
| 2009/0144624 A1 | 6/2009 | Barnes |
| 2009/0156307 A1 | 6/2009 | Aguirre et al. |
| 2009/0163272 A1 | 6/2009 | Baker et al. |
| 2009/0183098 A1 | 7/2009 | Casparian et al. |
| 2009/0189858 A1 | 7/2009 | Lev et al. |
| 2009/0253475 A1 | 10/2009 | Thompson et al. |
| 2009/0303204 A1 | 12/2009 | Nasiri et al. |
| 2009/0320055 A1 | 12/2009 | Langille et al. |
| 2010/0041480 A1 | 2/2010 | Wong et al. |
| 2010/0081505 A1 | 4/2010 | Alten et al. |
| 2010/0099491 A1 | 4/2010 | Little et al. |

(56) References Cited

U.S. PATENT DOCUMENTS

| | | |
|---|---|---|
| 2010/0113153 A1 | 5/2010 | Yen et al. |
| 2010/0179856 A1 | 7/2010 | Paretti et al. |
| 2010/0214226 A1* | 8/2010 | Brown ............ G06F 3/0426 345/168 |
| 2010/0279769 A1 | 11/2010 | Kidakam |
| 2010/0302257 A1 | 12/2010 | Perez et al. |
| 2011/0007021 A1 | 1/2011 | Bernstein et al. |
| 2011/0014984 A1 | 1/2011 | Penman et al. |
| 2011/0018795 A1 | 1/2011 | Jang |
| 2011/0021272 A1 | 1/2011 | Grant et al. |
| 2011/0028194 A1 | 2/2011 | Tang et al. |
| 2011/0034248 A1 | 2/2011 | Grever et al. |
| 2011/0045912 A1 | 2/2011 | Bortnick |
| 2011/0065509 A1 | 3/2011 | Rom et al. |
| 2011/0081969 A1 | 4/2011 | Ikeda et al. |
| 2011/0086706 A1 | 4/2011 | Zalewski et al. |
| 2011/0191686 A1 | 8/2011 | Wolff-Petersen et al. |
| 2011/0250967 A1 | 10/2011 | Kulas et al. |
| 2011/0312349 A1 | 12/2011 | Forutanpour et al. |
| 2012/0034978 A1 | 2/2012 | Lim |
| 2012/0050180 A1 | 3/2012 | King et al. |
| 2012/0071244 A1 | 3/2012 | Gillo et al. |
| 2012/0071248 A1 | 3/2012 | Hovseth |
| 2012/0155705 A1 | 6/2012 | Latta et al. |
| 2012/0223935 A1 | 9/2012 | Renwick et al. |
| 2012/0313901 A1 | 12/2012 | Monson et al. |
| 2012/0319989 A1 | 12/2012 | Argiro et al. |
| 2012/0323521 A1 | 12/2012 | De Foras et al. |
| 2013/0016042 A1 | 1/2013 | Makinen et al. |
| 2013/0055162 A1 | 2/2013 | Arriola et al. |
| 2013/0057299 A1 | 3/2013 | Unterreitmayer et al. |
| 2013/0077820 A1 | 3/2013 | Marais et al. |
| 2013/0090930 A1 | 4/2013 | Monson et al. |
| 2013/0127719 A1* | 5/2013 | Yasutake ............ G06F 3/038 345/163 |
| 2013/0145297 A1 | 6/2013 | Ricci et al. |
| 2013/0165180 A1 | 6/2013 | Fukuda Kelley et al. |
| 2013/0188866 A1 | 7/2013 | Obrador et al. |
| 2013/0196757 A1 | 8/2013 | Latta et al. |
| 2013/0242505 A1 | 9/2013 | Mak et al. |
| 2013/0273986 A1 | 10/2013 | Arnone et al. |
| 2013/0303281 A1 | 11/2013 | Argiro et al. |
| 2013/0325474 A1 | 12/2013 | Levien et al. |
| 2014/0129935 A1 | 5/2014 | Ovadia Nahon et al. |
| 2014/0168100 A1 | 6/2014 | Argiro et al. |
| 2014/0357372 A1 | 12/2014 | Garcia |
| 2015/0089262 A1 | 3/2015 | Cairns |
| 2016/0317923 A1 | 11/2016 | Wikel |
| 2016/0332072 A1 | 11/2016 | Mahlmeister et al. |
| 2017/0083194 A1 | 3/2017 | Aronzon et al. |
| 2017/0151498 A1 | 6/2017 | Soelberg |
| 2017/0189807 A1 | 7/2017 | Mahlmeister et al. |
| 2017/0259175 A1 | 9/2017 | Mahlmeister et al. |
| 2017/0319952 A1 | 11/2017 | Soelberg |
| 2018/0345142 A1 | 12/2018 | Mahlmeister et al. |
| 2019/0046877 A1 | 2/2019 | Mahlmeister et al. |
| 2019/0091566 A1 | 3/2019 | Mahlmeister et al. |
| 2019/0250777 A1 | 8/2019 | Aronzon |
| 2019/0291005 A1 | 9/2019 | Mahlmeister et al. |
| 2020/0061461 A1 | 2/2020 | Mahlmeister et al. |
| 2020/0086210 A1 | 3/2020 | Soelberg |
| 2021/0089176 A1 | 3/2021 | Aronzon et al. |
| 2021/0093951 A1 | 4/2021 | Mahlmeister et al. |
| 2021/0394062 A1 | 12/2021 | Mahlmeister et al. |
| 2022/0040569 A1 | 2/2022 | Mahlmeister et al. |
| 2022/0350452 A1 | 11/2022 | Aronzon et al. |
| 2023/0302356 A1 | 9/2023 | Mahlmeister et al. |

FOREIGN PATENT DOCUMENTS

| | | |
|---|---|---|
| WO | 2006/107296 A1 | 10/2006 |
| WO | 2011/130755 | 10/2011 |

OTHER PUBLICATIONS

"Battlefield 1942", published by EA Games in Sep. 2002 as evidenced by Battlefield 1942 Wikipedia article printed on Sep. 18, 2017., 2002.

"ControllerMate v4.6", OrderedBytes, 2012, 1 page.

"GestIC Technology Design Center", [http://www.microchip.com/pagehandler/en_us/technology/gestic, Apr. 29, 2013, 1 page.

"GestIC Technology Design Center", [http://www.microchip.com/pagehandler/en-us/technology/gestic/gettingstarted.html], Apr. 29, 2013, 1 page.

"IBM. Thinkvision Flat Panel Monitor L 150 Manual", Accessed via the Internet. Accessed Nov. 2, 2022, 2003, 33 pp.

"Leap Motion", [https://www.leapmotion.com/], Apr. 29, 2013, 6 pages.

"Near and Far Field", [http://en.wikipedia.org/wiki/Near_and_far_field], Wikipedia, May 2, 2013, 10 pages.

"Siri. Your Wish is its command.", http://www.apple.com/ios/siri/, Apr. 24, 2013.

Microsoft, , "Xbox 360 Limited Edition Metallic Silver Wireless Controller", http://www.microsoftstore.com/store/msstore/en_US/pd/ThemeID.27509700/Xbox-360-Limited-Edition-Metallic-Silver-Wireless-Controller/productID.246602800, Mar. 19, 2013.

Osoinach, B., ""Proximity Capacitive Sensor Technology for Touch Sensing Applications,"", Freescale Semiconductor, Tempe, AZ, 2008, 1-12.

Sony, "PS3 DualShock 3 Wireless Controller", http://www.gamestop.com/ps3/accessories/ps3-dualshock-3-wireless-controller/69638, Mar. 19, 2013.

* cited by examiner

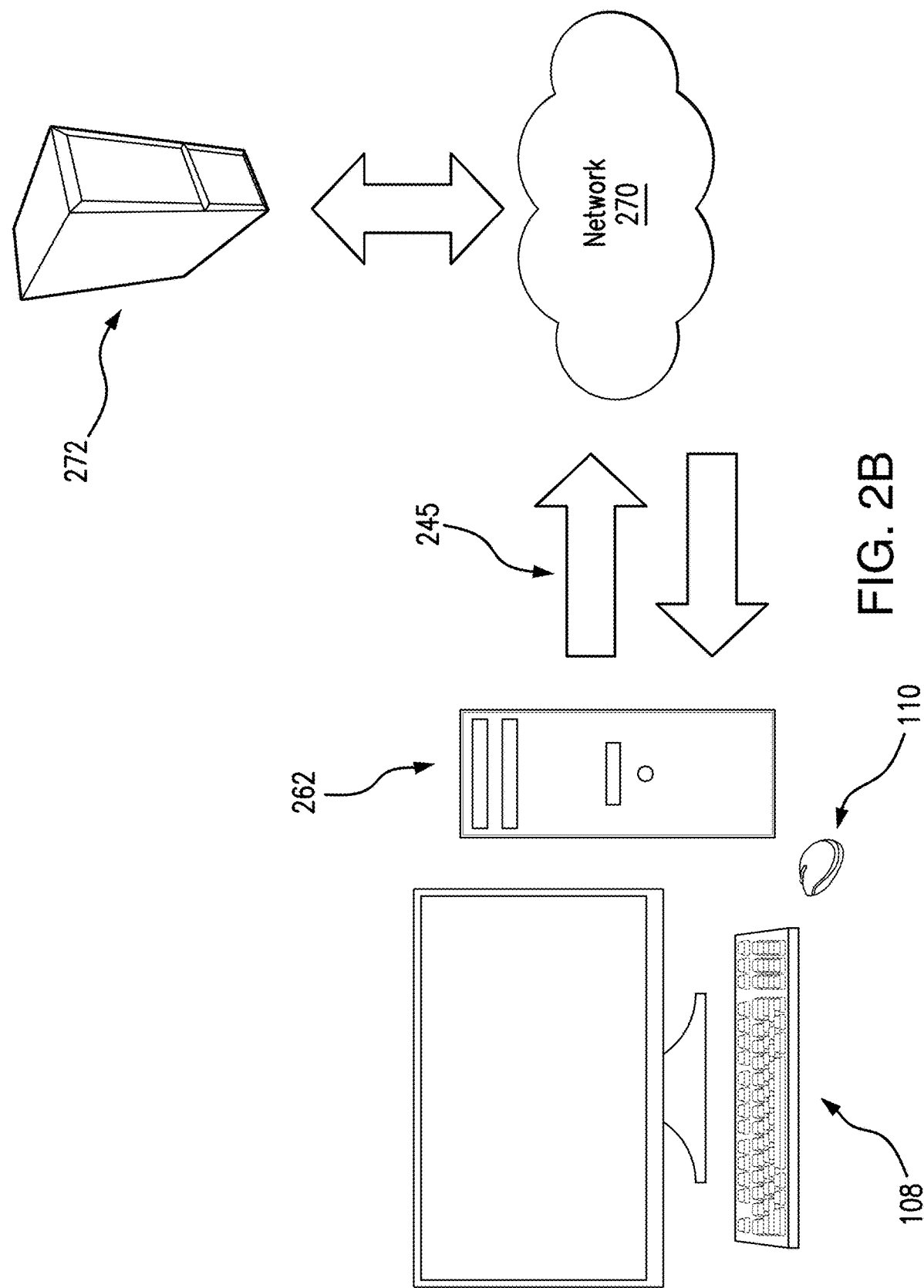

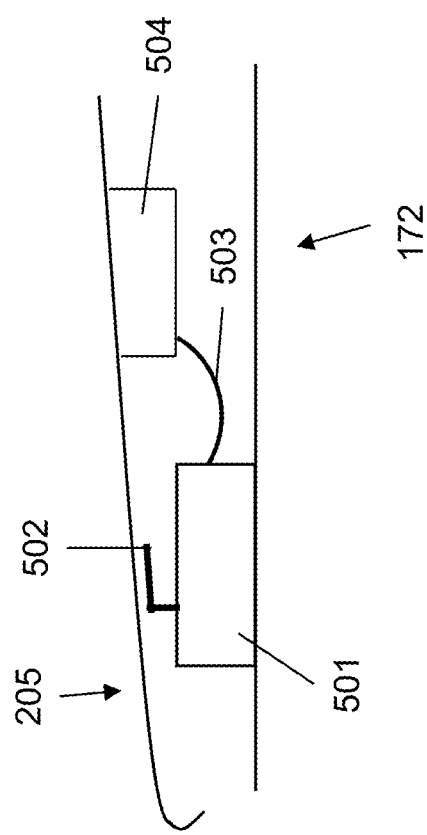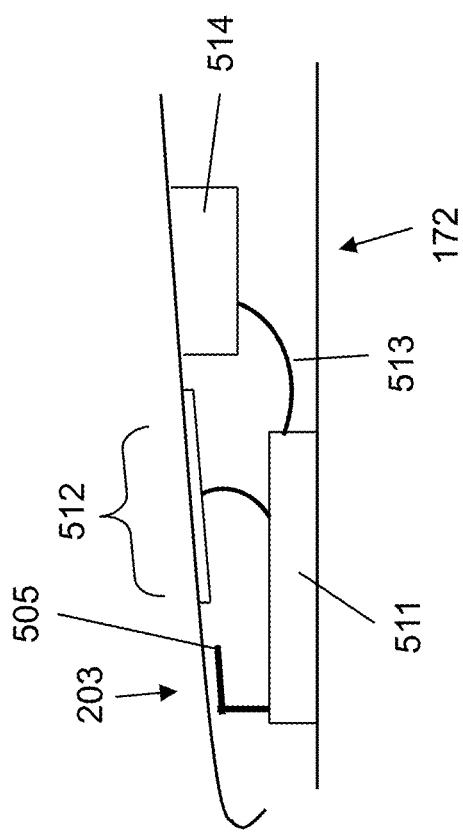

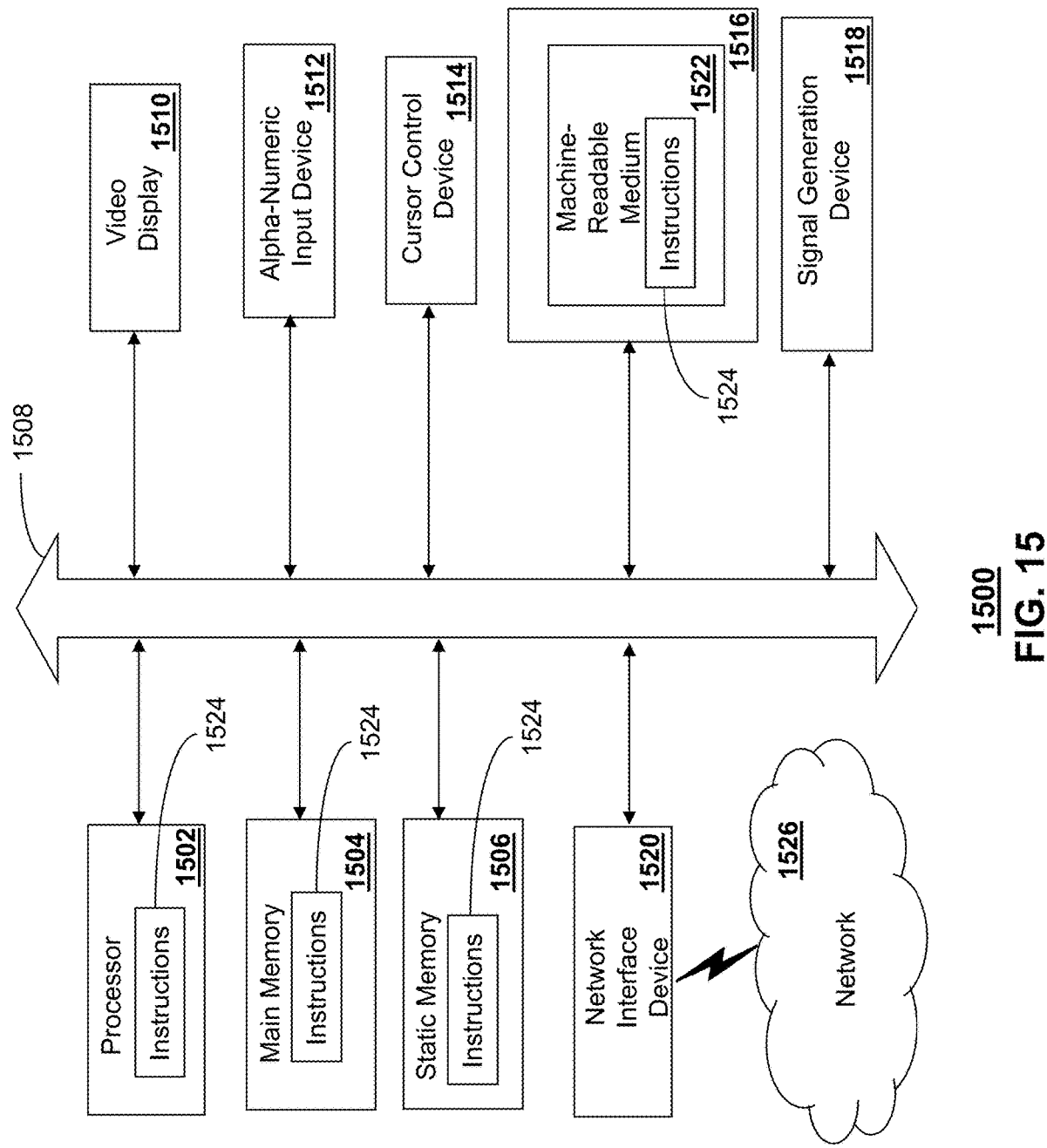

GAMING ACCESSORY WITH SENSORY FEEDBACK DEVICE

CROSS REFERENCE TO RELATED APPLICATIONS

This application is a continuation of U.S. patent application Ser. No. 17/511,213, filed Oct. 26, 2021, which is a continuation of U.S. patent application Ser. No. 17/118,906, filed Dec. 11, 2020, now U.S. Pat. No. 11,224,802, which is a continuation of U.S. patent application Ser. No. 16/666,900, filed Oct. 29, 2019, now U.S. Pat. No. 10,898,799, issued Jan. 26, 2021, which is a continuation of U.S. patent application Ser. No. 16/202,934, filed Nov. 28, 2018, now U.S. Pat. No. 10,500,489, issued Dec. 10, 2019, which is a continuation of U.S. patent application Ser. No. 15/222,358, filed Jul. 28, 2016, now U.S. Pat. No. 10,173,133, issued Jan. 8, 2019, which is a continuation of U.S. patent application Ser. No. 13/957,493, filed Aug. 2, 2013, now U.S. Pat. No. 9,423,874, issued Aug. 23, 2016, which claims the benefit of U.S. Provisional Application No. 61/792,519, filed Mar. 15, 2013. All sections of the aforementioned applications and patents are incorporated by reference herein in their entirety.

FIELD OF THE DISCLOSURE

The subject disclosure relates generally to a device for use by game players.

BACKGROUND

It is common today for gamers to utilize more than one gaming accessory. This is especially true of gamers who play on-line games or competitive games in a team or individual configuration. Gamers can have at their disposal accessories such as a keyboard, a general-purpose gaming pad, a mouse, a gaming console controller, a headset with a built-in microphone to communicate with other players, a joystick, a computer console, or other common gaming accessories.

A gamer can frequently use a combination of these accessories during a game. Efficient management and utilization of these accessories can frequently impact a gamer's ability to compete.

BRIEF DESCRIPTION OF THE DRAWINGS

Reference will now be made to the accompanying drawings, which are not necessarily drawn to scale, and wherein:

FIGS. 2A and 2B depict illustrative embodiments for communicatively coupling a gaming controller to a computing device via a network;

FIG. 5C is a schematic cross-sectional view of a gaming accessory including a pressure-actuated switch and a feedback generator, in accordance with an embodiment of the disclosure;

FIG. 5D is a schematic cross-sectional view of a gaming accessory including a pressure-actuated switch, a capacitive sensor interface, and a feedback generator, in accordance with another embodiment of the disclosure;

FIG. 15 depicts an illustrative diagrammatic representation of a machine in the form of a computer system within which a set of instructions, when executed, may cause the machine to perform any one or more of the methodologies disclosed herein.

DETAILED DESCRIPTION

The subject disclosure describes, among other things, illustrative embodiments of a gaming device. Other embodiments are contemplated by the subject disclosure.

One embodiment of the subject disclosure can entail a device comprising a touch-sensitive interface, a motion-sensitive component, a haptic feedback generator, a memory to store instructions, and a processor coupled to the touch-sensitive interface, the motion-sensitive component, the haptic feedback generator and the memory. The processor, responsive to executing the instructions, performs operations comprising receiving a first signal from the motion-sensitive component, receiving a second signal from the touch-sensitive interface, detecting from a combined signal comprising the first signal and the second signal, a selection of a portion of the device, and causing the haptic feedback generator to provide a haptic signal in accordance with the combined signal.

One embodiment of the subject disclosure can entail a computer-readable storage device comprising instructions, which when executed by a processor, cause the processor to perform operations comprising receiving a first signal from a motion-sensitive component of a device, receiving a second signal from a touch-sensitive interface of the device, detecting from a combined signal comprising the first signal and the second signal a selection of a portion of the device, and causing a haptic feedback generator of the device to provide a haptic signal in accordance with the combined signal.

One embodiment of the subject disclosure can entail a method comprising receiving, by a device comprising a processor, a first signal from a motion-sensitive component of the device; receiving, by the device, a second signal from a touch-sensitive interface of the device, detecting, by the device, from a combined signal comprising the first signal and the second signal, a selection of a portion of the device; and causing, by the device, a sensory feedback generator to provide a feedback signal in accordance with the combined signal.

Figure 1A:
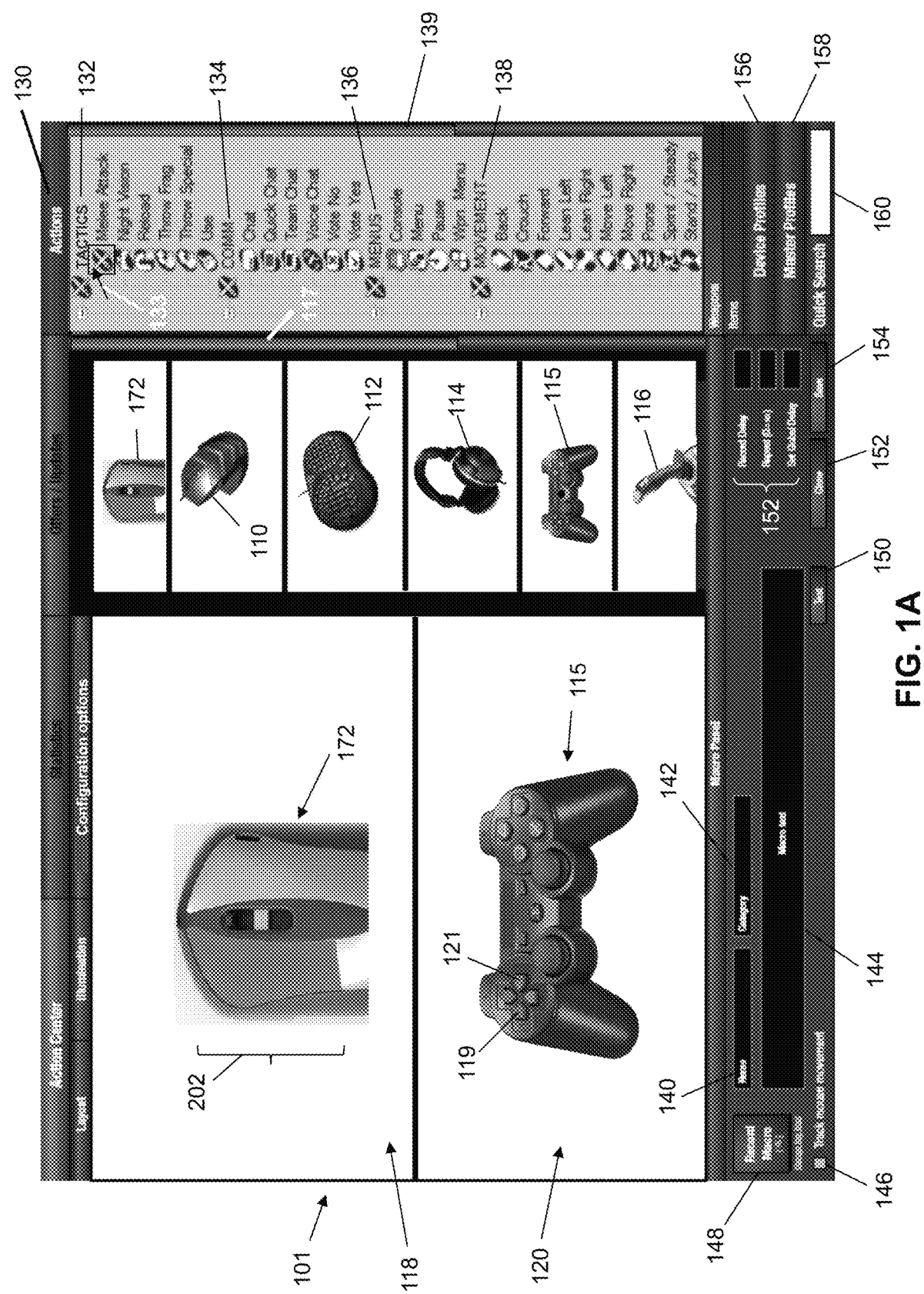
FIG. 1A depicts a first illustrative embodiment of a Graphical User Interface (GUI) generated by an Accessory Management Software (AMS) application according to the subject disclosure.
Figure 1B:
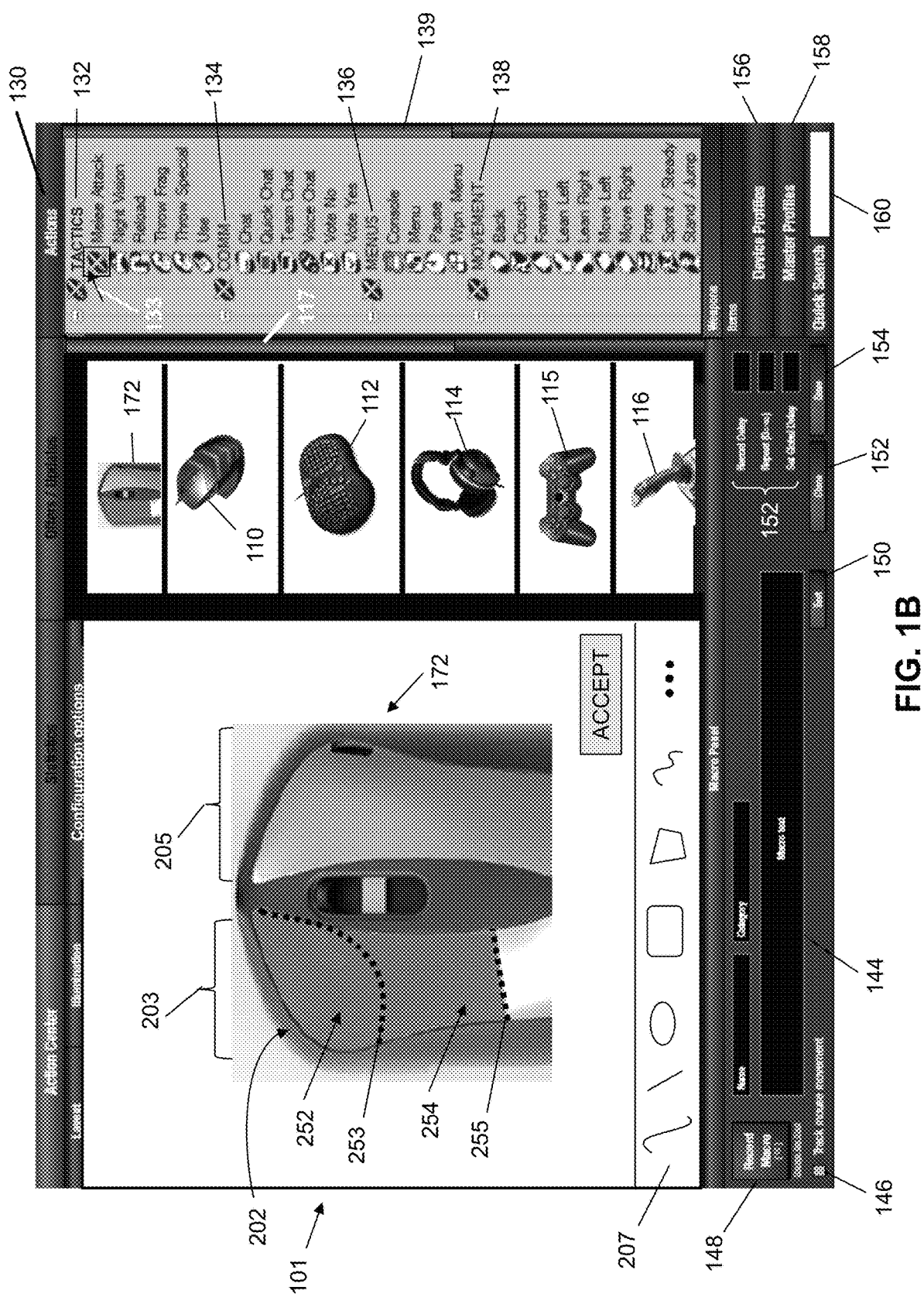
FIG. 1B depicts a second illustrative embodiment of a GUI generated by the AMS application according to the subject disclosure.

FIGS. 1A and 1B depict a Graphical User Interface (GUI) 101 generated by an Accessory Management Software (AMS) application according to the subject disclosure. The gamer can interact with one or more of the gaming accessories via the GUI. The GUI 101 presents accessories 110-116, 172 in a scrollable section 117. One or more of these accessories can be selected by a user with a mouse pointer. In FIG. 1A, the computer mouse 172 and the gaming controller 115 were selected for customization. The AMS application presents accessories 172 and 115 in split windows 118, 120, respectively, to assist the user during the customization process.

FIG. 1B depicts a gaming accessory that can be customized in accordance with an embodiment of the disclosure. (The accessory illustrated is a computer mouse 172; it will be appreciated that a variety of other accessories may be customized as described herein.) The accessory can comprise two mechanically depressible buttons 203 and 205 and include a touch-sensitive interface 202. The AMS application can also present drawing tools 207 to a user via the GUI 101. With the drawing tools, the user can draw virtual boundaries, e.g., 253 and 255, to depict virtual regions 252 and 254, respectively, as shown in FIG. 1B. Once the user has satisfactorily defined such regions, the user can select the accept button shown in the GUI of FIG. 1B.

The AMS application can be executed by a computing device such as a desktop computer, a laptop computer, a server, a mainframe computer, a gaming console, a gaming accessory, or combinations or combinations of portions thereof. The AMS application can also be executed by portable computing devices (with computing resources) such as a cellular phone, a smartphone, a personal digital assistant, a tablet, or a media player (such as an iPOD™). It is contemplated that the AMS application can be executed by any device with suitable computing resources.

As shown in FIGS. 1A and 1B, the AMS application can be programmed to detect a user selection of a particular software application such as a video game. This step can be the result of the user entering in a Quick Search field 160 the name of a gaming application (e.g., World of Warcraft™ or WoW). Upon identifying a gaming application, the AMS application can retrieve from a remote or local database gaming application actions which can be presented in a scrollable section 139 of the GUI 101, represented as "Actions" 130. The actions can be tactical actions 132, communication actions 134, menu actions 136, and movement actions 138 which can be used to invoke and manage features of the gaming application.

The AMS application can also respond to a user selection of a profile. A profile can be a device profile or master profile invoked by selecting GUI button 156 or 158, each of which can identify the association of gaming actions with input functions of one or more accessories.

The AMS application can also respond to a user selection to create a macro. A macro in the present context can mean any actionable command; that is, a sequence of stimuli generated by manipulating input functions of an accessory, a combination of actions in the Action section 130, an identification of a software application to be initiated by an operating system (OS), or any other recordable stimulus to initiate, control or manipulate software applications. Macros can be created from the GUI 101 by selecting a "Record Macro" button 148. The macro can be given a name and category in user-defined fields 140 and 142. Upon selecting the Record Macro button 148, a macro can be generated by selection of input functions on an accessory (e.g., Ctrl A, speech, navigation knob movements of the gaming controller 210, etc.) and/or by manual entry in field 144 (e.g., typing the name and location of a software application to be initiated by an OS, such as an instant messaging application, keyboard entries such as Ctrl A, etc.). Once the macro is created, it can be tested by selecting button 150 which can repeat the sequence specified in field 144. The clone button 152 can be selected to replicate the macro sequence if desired. Once the macro has been fully defined, selection of button 154 can record the macro. The macro can also be added to the items in Actions column 130, thereby enabling the user to associate the macro with input functions of the accessories (e.g., one or more touch-sensitive buttons 252 or 254 of accessory 172, buttons 119, 121 of gaming controller 115, etc.).

Any one of the actions 130 can be associated with one or more input functions of the accessories being customized in windows 118 and 120 by way of a drag and drop action or other customization options. A user can select an action by placing a mouse pointer 133 over a symbol associated with the action and then drag the symbol to any of the input functions (e.g., touch-sensitive buttons) of the accessory 172 to make an association with an input function of that accessory. Actions of one accessory can also be associated with another accessory of a different category. For example, key depressions "Ctrl A" of a keyboard can be associated with virtual button 254 of accessory 172. Thus, when the left mechanical button 203 is depressed with a finger at virtual button 254, the stimulus signal that is generated can be substituted by the AMS application with "Ctrl A". In another embodiment, a selected action can be associated with a combination of key button presses (e.g., simultaneous depression of the left and right buttons 203, 205, or a sequence of button depressions: two rapid left button depressions followed by a right button depression).

Figure 2A:
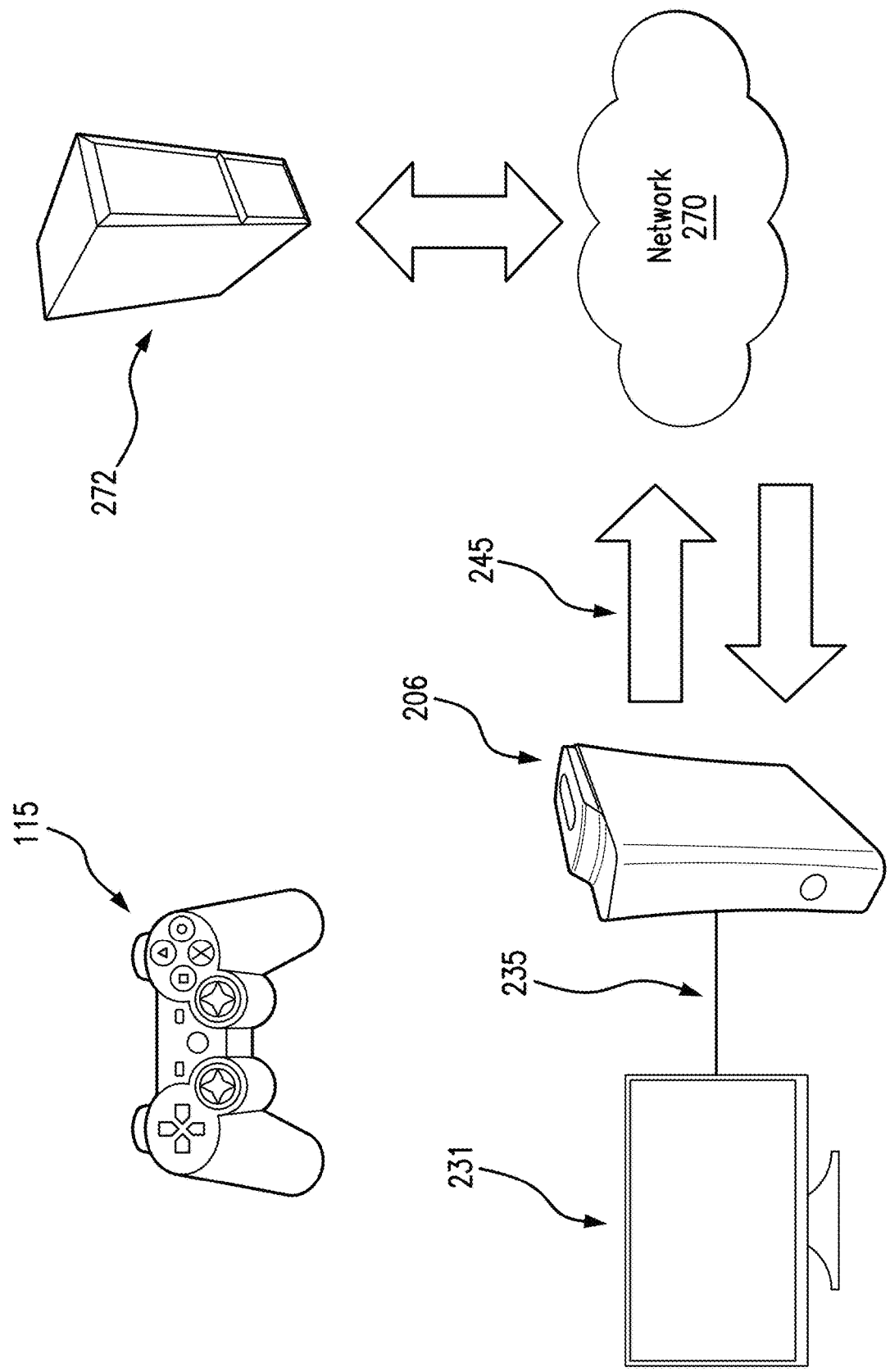

FIG. 2A schematically depicts a gaming controller 115 which can be used by a gamer, according to an embodiment of the subject disclosure. In this embodiment, gaming controller 115 and gaming console 236 have an integrated wireless interface for wireless communications therebetween (e.g., Wi-Fi, Bluetooth, ZigBee, or a proprietary protocol). The gaming console 236 can also be coupled to network 270 via communication link 245, such as a Wi-Fi link, to the internet. The gaming console 236 can be, for example, an Xbox™, a PS3™, a Wii™, or another suitable gaming console device. Video information is displayed to the gamer on display device 231, which in this illustration is coupled to gaming console 236 by a wired connection 235, but can be replaced, if desirable, by a wireless interface (e.g., wireless HDMI. Display device 231 may be a television as illustrated or a touch screen comprising both an input device and an output device. Alternatively, the gaming controller 115 can be tethered to a computing device such as the gaming console by a cable (e.g., USB cable) to provide a means of communication less susceptible to electromagnetic interference or other sources of wireless interference.

FIG. 2B depicts an alternative embodiment in which a desktop computer 242 is used in place of the gaming console 236. In one embodiment, the desktop computer 242 can be configured to execute a gaming client (i.e., a software application) acting in cooperation with an on-line gaming server 272 accessible by the desktop computer 242 via the network 270 (e.g., World of Warcraft™). In another embodiment, the desktop computer 242 can be configured to execute a localized gaming software application without accessing the on-line gaming server 272.

The gaming accessory used with the desktop computer 242 can be a keyboard 112, mouse 110, or another suitable gaming accessory device. In the present context, an accessory can represent any type of device which can be communicatively coupled to the computing device (or an integral part of the computing device) and which can control aspects of an operating system (OS) and/or a software application operating in the computing device. An accessory can represent for example a keyboard, a touch screen display, a gaming pad, a gaming controller, a mouse, a joystick, a microphone, or a headset with a microphone—just to mention a few.

It is understood that the devices shown in FIGS. 1A, 1B, 2A and 2B are mere illustrations of possible gaming configurations. The subject disclosure is applicable to other gaming configurations and is thereby not limited by those described in FIGS. 1A, 1B, 2A and 2B.

Figure 3:
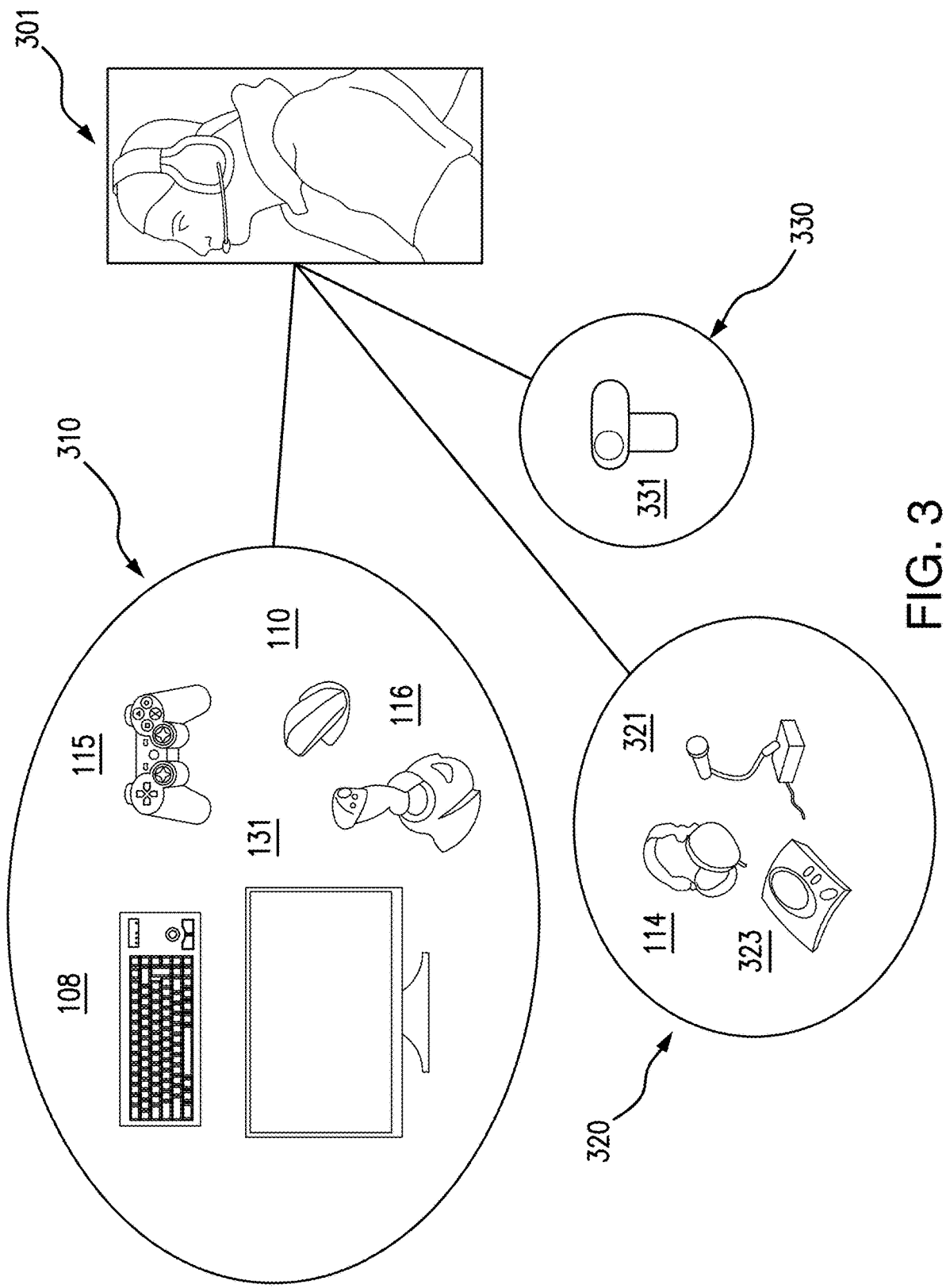
FIG. 3 schematically illustrates gaming accessories that can be used by a gamer interacting with a gaming engine.

FIG. 3 illustrates gaming accessory devices with which a gamer 301 can interact. Touch-sensitive devices 310 can include a gaming controller 115, mouse 110, keyboard 112, touchscreen display 231, and joystick 116. Audio devices 320 can include headphones 114, microphone 321, and speakerphone 323. Imaging devices 330 can include webcam 331. These accessory devices can provide tactile, audio, and/or visual stimuli to a gamer, receive responses from the gamer to thereby generate stimuli which can be interpreted by a gaming software application, or both.

The accessories can be coupled to the computing device by a tethered interface (e.g., USB cable), a wireless interface (e.g., Bluetooth or Wireless Fidelity—Wi-Fi), or combinations thereof.

The term "gaming system," as used herein, refers to the combination of computing hardware and software that delivers a gaming experience. The software applications that present and manage the gaming experience are collectively referred to herein as a "gaming engine." The gaming engine generally includes the AMS for managing and augmenting usage of the various accessories, and an Application Program Interface (API) for receiving feedback from a computing device which is a subset of the gaming system that executes a gaming software application. The computing device can be a gaming console, a server, a local computer, a portable communication device, combinations thereof, or other devices with suitable processing resources.

Figure 4:
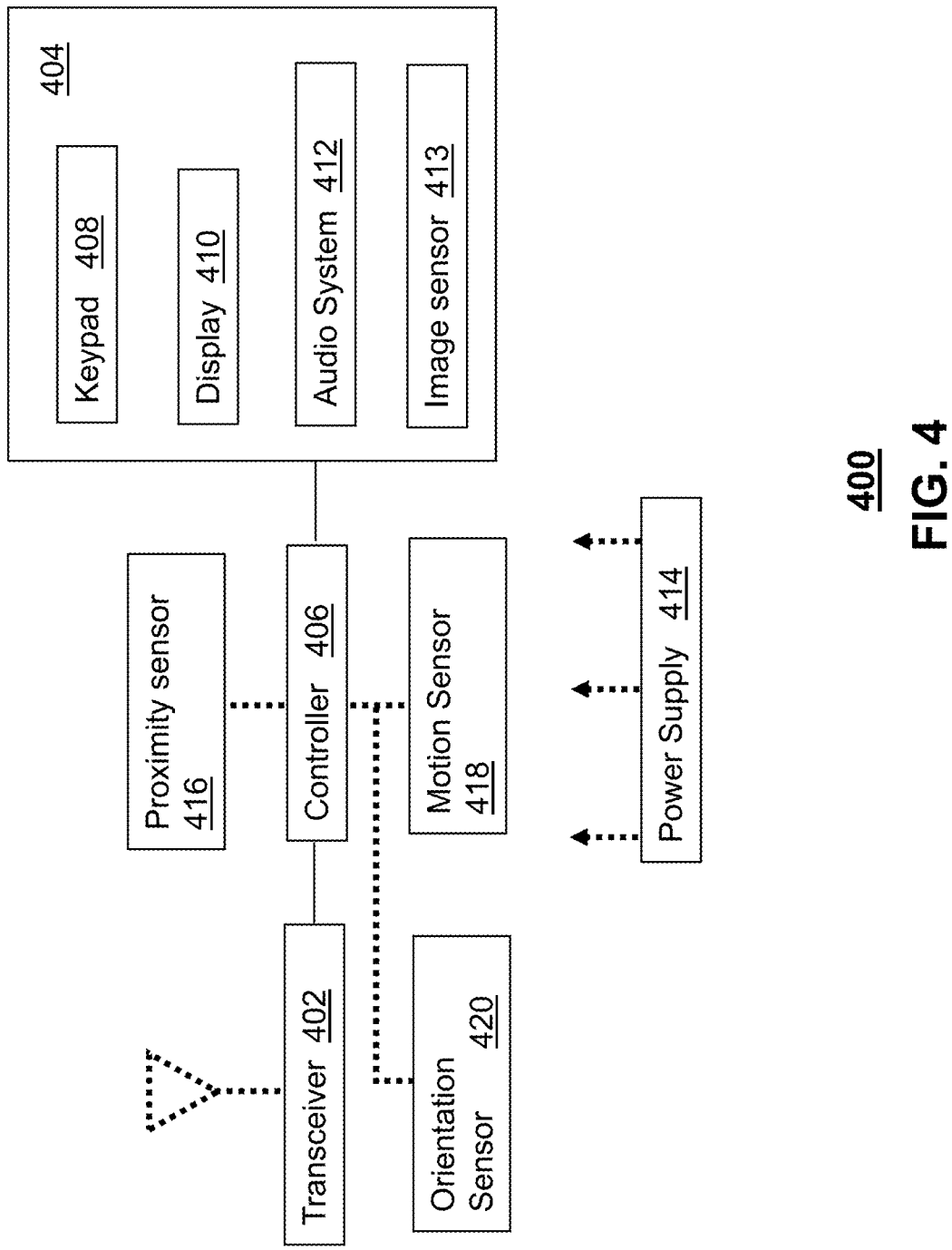
FIG. 4 depicts an illustrative embodiment of a communication device.

FIG. 4 depicts an illustrative embodiment of a computing device 400. Computing device 400 can serve in whole or in part as an illustrative embodiment of the devices depicted in FIGS. 1-3. The computing device 400 can comprise a wireline and/or wireless transceiver 402 (herein transceiver 402), a user interface (UI) 404, a power supply 414, a proximity sensor 416, a motion sensor 418, an orientation sensor 420, and a controller 406 for managing operations thereof. The transceiver 402 can support short-range or long-range wireless access technologies such as Bluetooth, Wi-Fi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, software defined radio (SDR), Long Term Evolution (LTE), as well as proprietary or other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 coupled to a navigation mechanism such as a roller ball, a joystick, a mouse, or a navigation disk for manipulating operations of the computing device 400. The keypad 408 can be an integral part of a housing assembly of the computing device 400 or an independent device operably coupled thereto by a tethered wireline interface (such as a USB cable) or a wireless interface supporting for example Bluetooth. The keypad 408 can represent a numeric keypad, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the computing device 400.

In an embodiment where the display 410 is touch-sensitive, a portion or all of the keypad 408 can be presented by way of the display 410 with navigation features (e.g., an iPad™, iPhone™, or Android™ phone or tablet). As a touch screen display, the computing device 400 can be adapted to present a user interface with graphical user interface (GUI) elements that can be selected by a user with a touch of a finger. The touch screen display 410 can be equipped with capacitive, resistive or other forms of sensing technology to detect how much surface area of a user's finger has been placed on a portion of the touch screen display. This sensing information can be used to control the manipulation of the GUI elements.

The UI 404 can also include an audio system 412 that utilizes common audio technology for conveying low volume audio (such as audio heard only in the proximity of a human ear) and high-volume audio (such as speakerphone for hands free operation, stereo or surround sound system). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images and performing image recognition therefrom.

The power supply 414 can utilize common power management technologies such as replaceable or rechargeable batteries, supply regulation technologies, and charging system technologies for supplying energy to the components of the computing device 400 to facilitate long-range or short-range portable applications. Alternatively, the charging system can utilize external power sources such as DC power supplied over a physical interface such as a USB port or by way of a power cord attached to a transformer that converts AC to DC power.

The proximity sensor 416 can utilize proximity sensing technology such as an electromagnetic sensor, a capacitive sensor, an inductive sensor, an image sensor or combinations thereof. The motion sensor 418 can utilize motion sensing technology such as an accelerometer, a gyroscope, or other suitable motion sensing technology to detect movement of the computing device 400 in three-dimensional space. The orientation sensor 420 can utilize orientation sensing technology such as a magnetometer to detect the orientation of the computing device 400 (North, South, West, East, combined orientations thereof in degrees, minutes, or other suitable orientation metrics).

The controller 406 can utilize computing technologies such as a microprocessor, a digital signal processor (DSP), and/or a video processor with associated storage memory such as Flash, ROM, RAM, SRAM, DRAM or other storage technologies.

Other components not shown in FIG. 4 are contemplated by the subject disclosure. For instance, the computing device 400 can include a reset button (not shown). The reset button can be used to reset the controller 406 of the computing device 400. In yet another embodiment, the computing device 400 can also include a factory default setting button positioned below a small hole in a housing assembly of the computing device 400 to force the computing device 400 to re-establish factory settings. In this embodiment, a user can use a protruding object such as a pen or paper clip tip to reach into the hole and depress the default setting button.

The computing device 400 as described herein can operate with more or fewer components described in FIG. 4 to accommodate the implementation of the devices described by the subject disclosure. These variant embodiments are contemplated by the subject disclosure.

FIGS. 5A-5G illustrate, in accordance with embodiments of the disclosure, a gaming accessory with mechanical buttons, touch-sensitive capacitive interfaces, and haptic feedback generators, as discussed in more detail below.

Figure 5A:
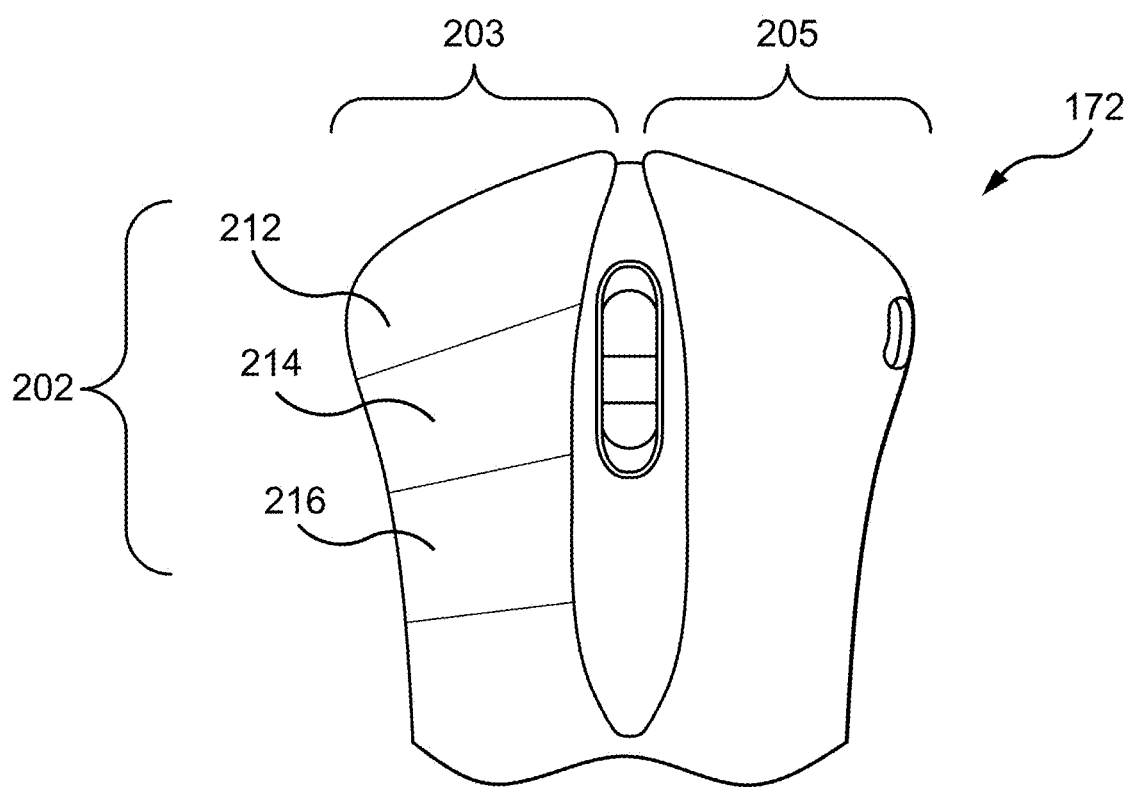
FIGS. 5A and 5B illustrate a gaming accessory with multiple interfaces for user input, in accordance with embodiments of the disclosure.

FIG. 5A depicts an embodiment of a gaming accessory 172 (for example, a mouse) in accordance with an embodiment of the disclosure, including a touch-sensitive interface 202. The gaming accessory 172 can comprise two mechanically depressible buttons 203 and 205. Depression of the left or the right mechanical buttons 203, 205 can be detected by a micro switch 501 (see FIG. 5C). The left mechanical button 203 can also include on a top surface having three electrically isolated capacitive sensors 212, 214, and 216 for sensing touch by a user's finger. Each of the electrically isolated capacitive sensors 212, 214, and 216 can be mapped into three distinct sectors that can be treated as three distinct touch-sensitive buttons. The left mechanical button 203 can thus be treated as three buttons 212, 214, 216 detectable by the position of the user's finger.

The buttons 212, 214, 216 are each provided with a haptic feedback generator. In an embodiment, the haptic feedback generator is a vibrator installed beneath each button. Each button, when actuated, delivers a vibration signal characteristic of that button (frequency, pulses, amplitude, duration, or combination thereof). In an embodiment, the number of pulses corresponds to a button for a particular sector of button 203; for example, one pulse for sector button 212, two pulses for sector button 214, and so on. Additional vibrators may be installed so that actuating a combination of buttons produces another distinct vibration signal that is characteristic of that combination.

Figure 5B:
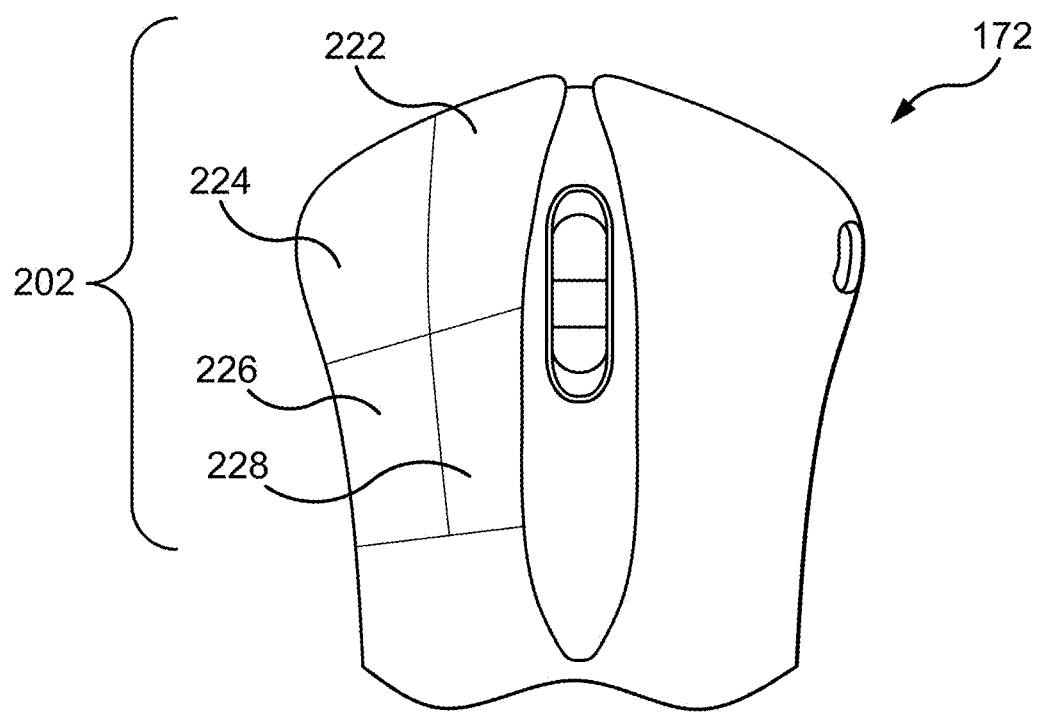

FIG. 5B depicts another embodiment of the disclosure, in which gaming accessory 172 utilizes a micro switch for each of the left and right mechanical buttons 203, 205. The touch-sensitive interface 202 on the left button 203 is subdivided into four electrically isolated capacitive sensing regions that can be mapped to four sectors 222, 224, 226 and 228. Accordingly, the left mechanical button 203 can represent four buttons depending on where the user places his/her finger when depressing the left mechanical button 203. The generation of the same signals discussed above (actuation signal and capacitive sensor signal) are applicable in this embodiment with the exception that the capacitive sensor signal can identify one of four touch-sensitive buttons rather than one of three touch-sensitive buttons illustrated in FIG. 5A.

FIG. 5C is a cross-sectional schematic view of mechanical button 205 of accessory 172, including a haptic generator in accordance with an embodiment of the disclosure. Micro switch 501 has an actuator (electrical contact, plunger switch, or the like) 502 disposed underneath mechanical button 205. More generally, actuator 502 can be any device to sense downward mechanical motion of the button and provide a signal indicating such motion. Micro switch 501 can deliver an actuation signal via link 503 to haptic generator 504 disposed below the button (in the embodiment shown in FIG. 5C, attached to the underside of the button). If a user depresses mechanical button 205, the micro switch 501 will generate the actuation signal and activate the haptic generator to provide feedback (e.g., a vibration) to the user. In other embodiments, the generator is capable of providing several different types of feedback (haptic and non-haptic), and the actuation signal can be transmitted over a cable (e.g., USB cable) or a wireless interface to a computer (not shown) communicatively coupled to the gaming accessory 172. The computer can be configured to direct the generator to generate any of a variety of sensory feedback signals: vibrations, light signals (e.g., flashes), sounds, etc. or a combination thereof. The particular feedback can be specified by the user, so that the accessory 172 is customized with respect to the stimulus input by the user and the response by the accessory.

FIG. 5D is a cross-sectional schematic view of mechanical button 203 of accessory 172, including a capacitive sensor and a haptic generator in accordance with an embodiment of the disclosure. In this embodiment, a microcontroller unit 511 includes a micro switch and has as inputs both a mechanical/electrical actuation signal via actuator 505 and a signal from capacitive sensor 512. Referring again to FIG. 5A, if a user places a finger on button 212 and depresses the left mechanical button 203 while maintaining his/her finger at button 212, the micro switch of microcontroller unit 511 will generate an actuation signal, while the capacitive sensor 512 will generate another signal associated with sector 212 indicating that the user's finger is at the button associated with this sector. The combined signal can be transmitted over link 513 to haptic generator 514 to deliver haptic feedback to the user. The haptic feedback can be any of a variety of vibrations, light signals (e.g., flashes), sounds, etc. or a combination thereof. In another embodiment, the combined signal can be transmitted from microcontroller unit 511 over a cable (e.g., USB cable) or a wireless interface to a computer (not shown) communicatively coupled to the gaming accessory 172. In addition, microcontroller unit 511 can include a microprocessor that executes instructions stored in a memory to process the actuation signal and the signal generated by the capacitive sensor. The processor can then transmit signals to the computer.

Figure 5E:
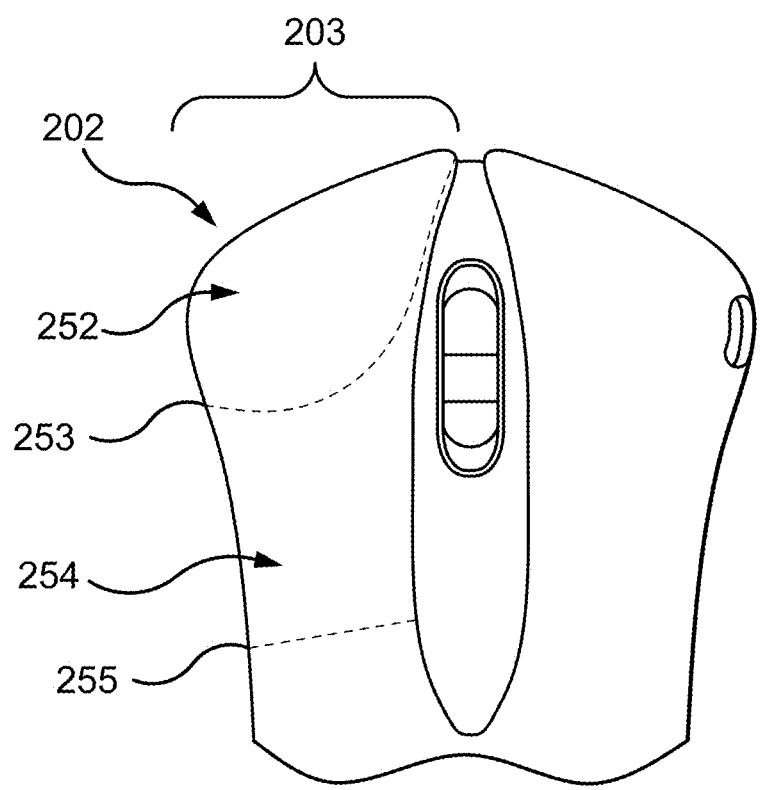
FIG. 5E illustrates a gaming accessory with a customizable interface including a plurality of regions, in accordance with another embodiment of the disclosure.

As discussed above with reference to FIG. 1B, the user (with drawing tools 207, via GUI 101) can draw virtual boundaries 253 and 255 to depict virtual regions 252 and 254 of touch-sensitive interface 202 (FIG. 5E). Since the capacitive sensor 512 can provide a coordinate signal indicating where a user places his/her finger, it is possible for a user to identify by way of the GUI of FIG. 1B any number of virtual regions that correspond to touch-sensitive mouse buttons. Each region can be associated with a distinct feedback signal to aid the user in identifying the region. For example, the feedback signal can include haptic feedback (e.g., vibration) with one pulse for a first region 252, two pulses for a second region 254, and so on. The feedback signal can also include audible feedback (e.g., a beep tone) with one beep for first region 252, two beeps for second region 254, and so on. With sufficient trial and error practice sessions, a user can grow accustomed to sensing where the virtual regions are located without visual assistance. In an embodiment, a thin film illuminating material, such as a thin film light emitting diode (LED) array, can be overlaid on the interface 202. The thin film LED array can in turn be controlled to illuminate portions or outlines of the virtual regions to identify the mouse buttons constructed by the user in the GUI of FIG. 1B. The thin film LED array can be controlled by the microcontroller 511 or the computer communicatively coupled thereto over a wired or wireless interface with suitable control circuits.

In another embodiment, capacitive sensor 512 can comprise an array of sensors mounted on the underside of mechanical button 203, with each sensor of the array connected to microcontroller unit 511. Microcontroller unit 511 can be directed to interpret signals from sensors on one side of boundary 253 as actuation of area 252 of button 203 and interpret signals from sensors on the other side of boundary 253 as actuation of area 254 of button 203. Accordingly, the user can customize button 203 with a plurality of touch-sensitive regions of various desired sizes and shapes. In an embodiment, the haptic generator 514 can likewise be realized as an array of independently addressable and programmable elements, so that touching the user-defined areas 252, 254 results in haptic feedback specific to that area.

Figure 5F:
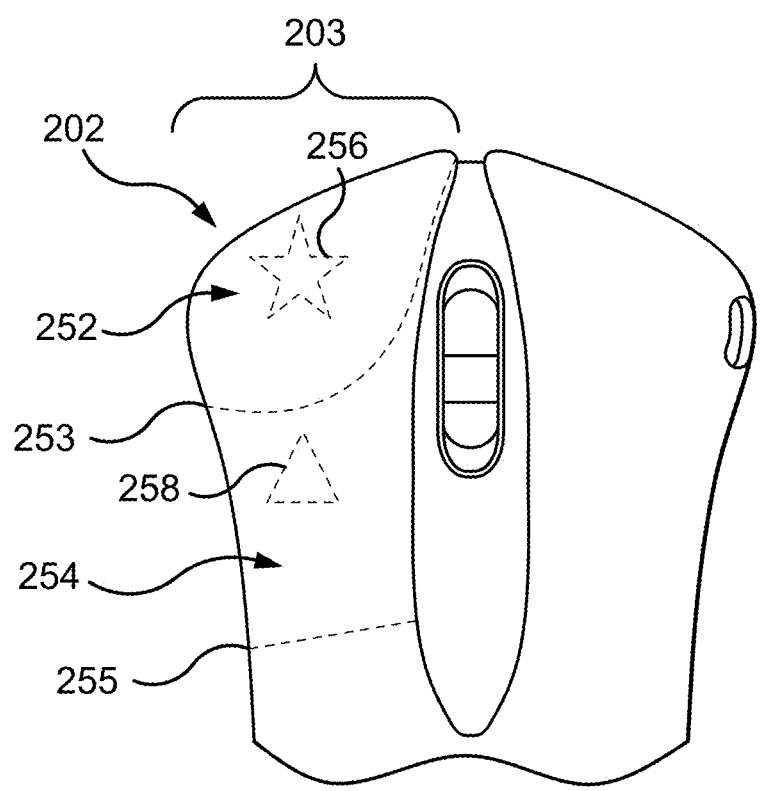
FIG. 5F illustrates a gaming accessory with customizable feedback in each of the regions according to location with respect to the interface, in accordance with a further embodiment of the disclosure.

In a further embodiment, as shown in FIG. 5F, touch-sensitive interface 202 can include a shape-shifting polymer, so that the haptic feedback can be a tactile sensation of a particular shape. For example, if a user places a finger on region 252 and depresses the mechanical button 203, actuator 505 will cause the micro switch of microcontroller unit 511 to generate an actuation signal, while the capacitive sensors underlying region 252 will generate another signal associated with region 252 indicating that the user's finger is at the button associated with this region. The haptic generator 514 can then respond to the combined signal by causing the polymer to present a raised (or depressed) area of a predetermined shape as tactile feedback. In the embodiment shown in FIG. 5F, touching region 252 causes a star shape 256 to be formed in that region under the user's finger, while touching region 254 causes a triangle shape 258 to be formed in that region.

Figure 5G:
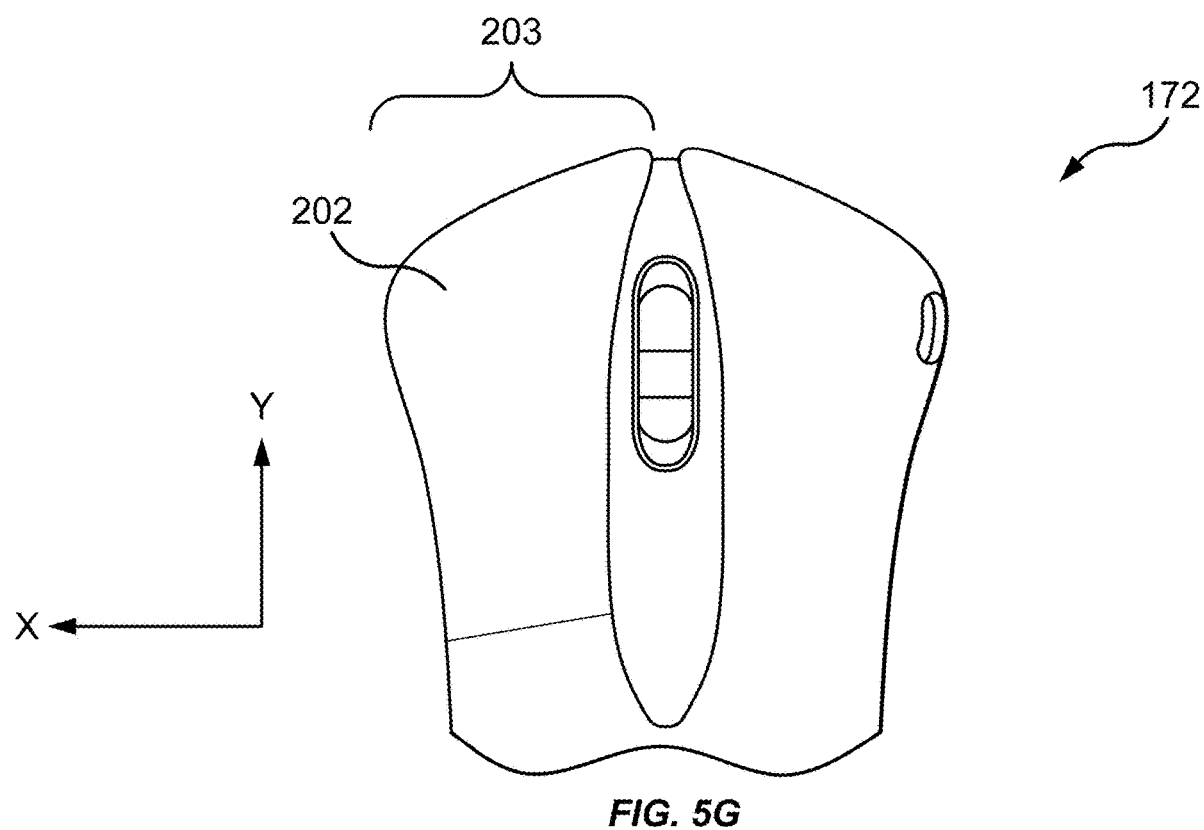
FIG. 5G illustrates a gaming accessory with variable feedback according to location with respect to the interface, in accordance with a further embodiment of the disclosure.

In another embodiment, as shown schematically in FIG. 5G, the capacitive sensor 512 can provide a coordinate signal indicating where a user places his/her finger relative to a virtual x-y grid covering interface 202. If a user places a finger on a given location of interface 202 and depresses the mechanical button 203, actuator 505 will cause the micro switch of microcontroller unit 511 to generate an actuation signal, while the capacitive sensor underlying that location will generate another signal associated with the x-y coordinates of that location on interface 202. The haptic generator 514 then provides feedback according to those coordinates (e.g., sound of increasing frequency with increasing x and increasing volume with increasing y, light of progressively different color and intensity, etc.).

It is noted that the above embodiments for FIGS. 5A-5G can be applied to either or both of the left mechanical button 203 and right mechanical button 205. Accordingly, accessory 172 can have one or both mechanical buttons 203, 205 with touch-sensitive mouse buttons at a top surface with the same or different geometric configurations. It is further noted that other technologies for sensing touch such as a resistive, surface acoustic wave, surface capacitance, projected capacitance, mutual capacitance, self-capacitance, infrared grid, infrared acrylic projection, optical imaging, dispersive signal technology, acoustic pulse recognition, as well as next generation sensing technologies can be used in place of the embodiments discussed with reference to FIGS. 5A-5G.

Figure 6:
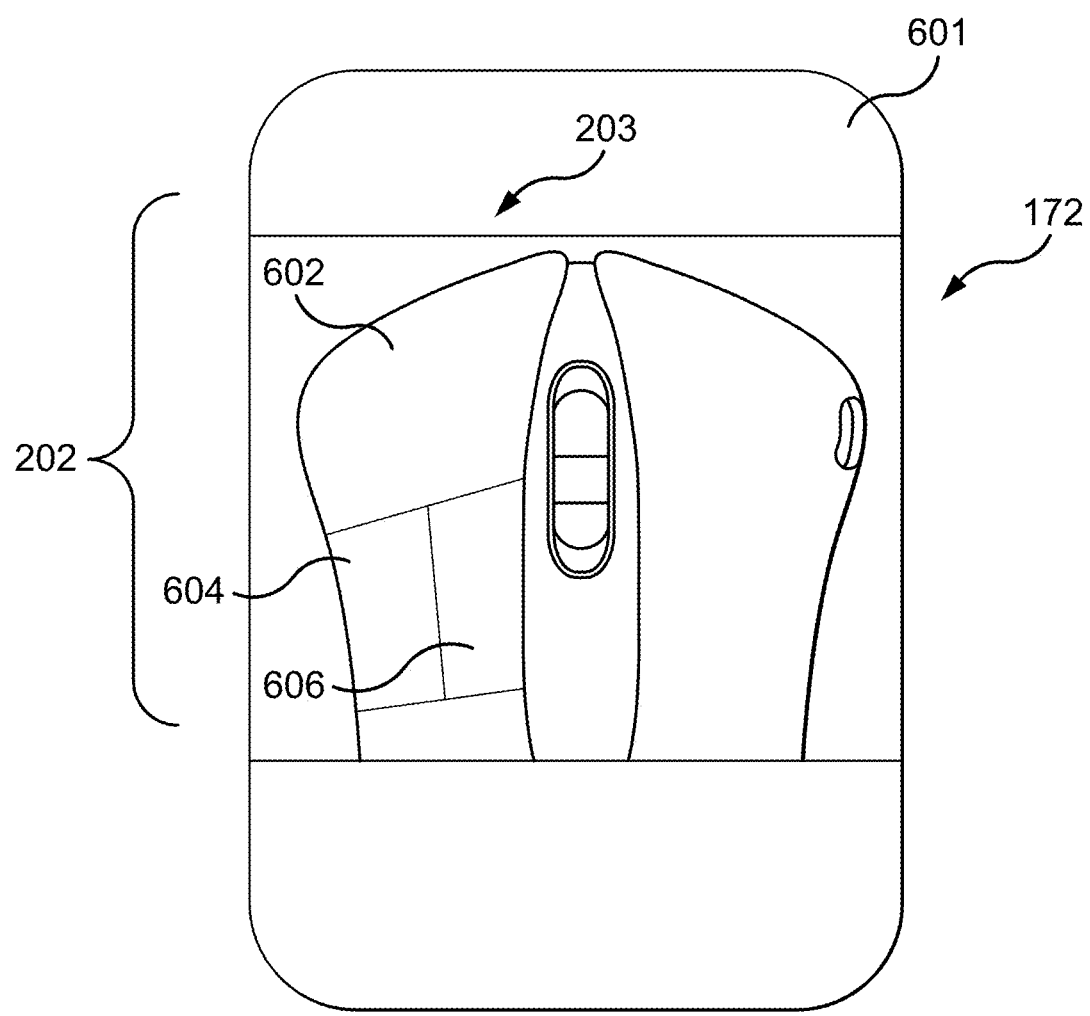
FIG. 6 illustrates a display of an image of a gaming accessory to provide feedback when the accessory is used, in accordance with another embodiment of the disclosure.

Feedback from an accessory 172 may also be provided using a display of the accessory buttons, as shown in FIG. 6. In this embodiment, an image 601 of accessory 172 is presented on a display device connected to a computer that is also in communication with the accessory (via USB cable, wireless connection, or some other type of connection). In this example, interface 202 of mechanical button is subdivided into three regions 602, 604, 606. If a user places a finger on region 604 of the accessory and depresses the mechanical button 203 while maintaining his/her finger at button 604, the micro switch of microcontroller unit 511 will generate an actuation signal, while the capacitive sensor 512 will generate another signal associated with region 604 indicating that the user's finger is at the button associated with this region. The combined signal can be transmitted over link 513 to haptic generator 514 to deliver haptic feedback to the user. In this embodiment, the combined signal is also transmitted from microcontroller unit 511 over a cable (e.g., USB cable) or a wireless interface to a computer (not shown) communicatively coupled to the gaming accessory 172 and to the display device presenting image 601. The portion of image 601 showing region 604 is then highlighted (presented in a contrasting color, with a colored outline, or the like) to provide the user with visual feedback relating to actuation of the button at region 604.

Figure 7:
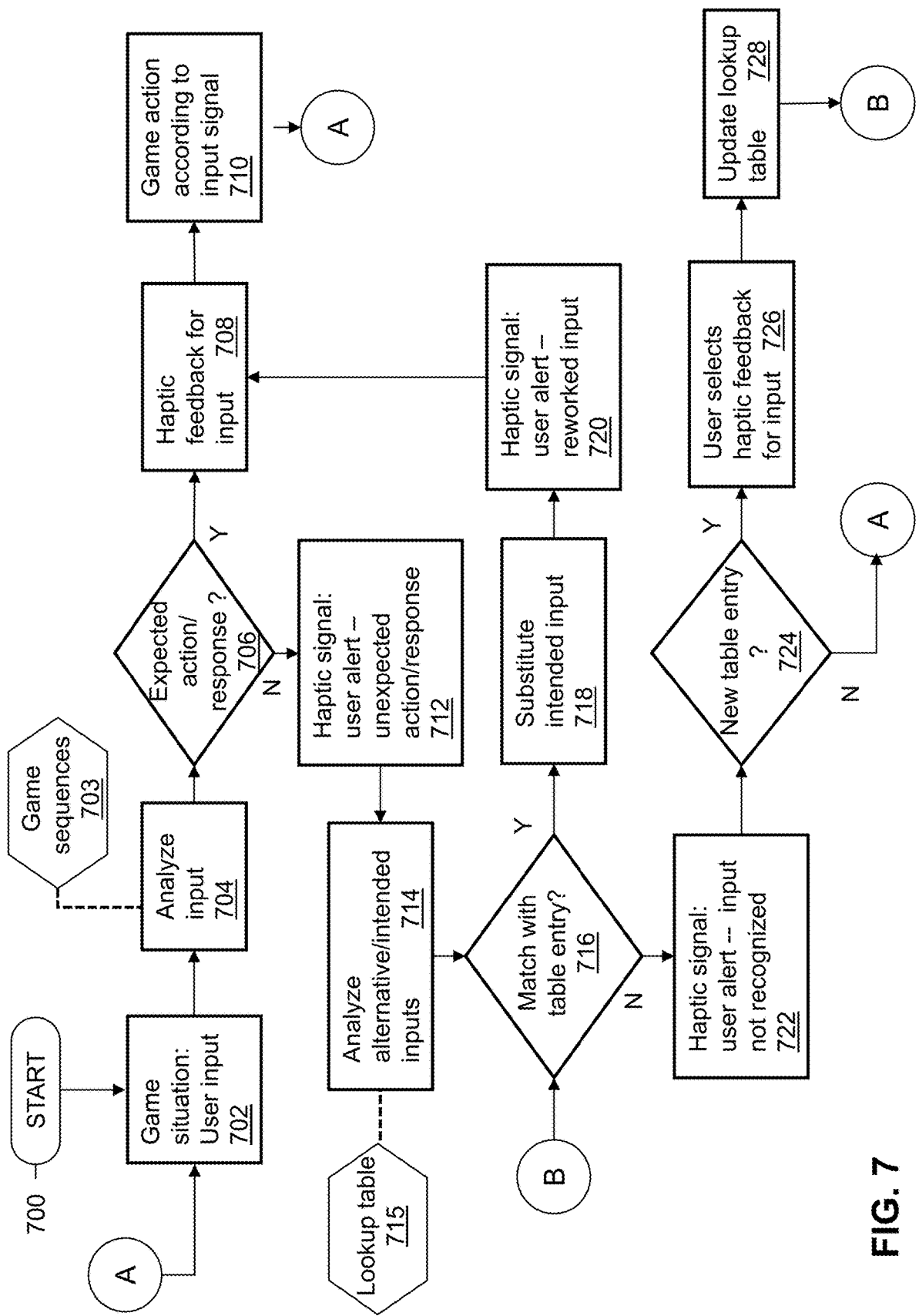
FIG. 7 is a flowchart of a procedure for training a user of a gaming accessory, in accordance with another embodiment of the disclosure.

Haptic feedback can be employed in training users of gaming accessories. A training procedure for using an accessory in a particular game is shown in the flowchart of FIG. 7. The gaming engine (more specifically, the AMS) has a library of commands a user may transmit with the accessory 172, correlated to the action the gaming engine is configured to make in response to the various commands. The list of commands and their corresponding game actions may be understood as a lookup table.

At the start of the procedure 700, the user is confronted with a game situation and makes an input to the gaming engine related to that situation (step 702). The gaming engine analyzes the input (step 704) in light of the particular game situation and in the context of the sequence 703 of game situations. A decision 706 is made whether the user's input would be expected in that situation. If so, the gaming engine causes the haptic feedback generator to deliver the haptic feedback ordinarily associated with that input (step 708) and directs that the game action take place according to the user input (step 710). However, if the user's input corresponds to an unexpected action or response in the game situation (step 712), the gaming engine causes the haptic signal generator to deliver an alert signal to the user (for example, a rapid series of short vibrations instead of a single long vibration ordinarily associated with the input).

The gaming engine then analyzes the various possible inputs for the game situation (step 714) in order to determine what the user's intended input may have been or what input would be more appropriate for the game situation. For example, if the input "double-click left button while holding down right button" has no entry in the lookup table 715 and thus is not understood by the gaming engine, but the input "double-click left button" is to be interpreted "advance 10 meters" according to the lookup table 715, the gaming engine can conclude (step 716) that the latter input was actually intended. The gaming engine can then proceed with a substituted input based on the lookup table entry (step 718) and deliver an additional haptic feedback signal to the user (step 720) to alert the user that the input has been modified.

If the gaming engine cannot recognize the user input, the gaming engine can cause the haptic feedback generator to deliver an additional alert signal (step 722). If the user wishes to have his original input recognized in the future as equivalent to the input determined by the gaming engine (step 724), the user can invoke a procedure to specify a haptic feedback acknowledging that input (step 726) and update the lookup table accordingly (step 728). This procedure is useful in cases where the user wishes to be sure of making a recognized input in a frequently encountered game situation.

Figure 8:
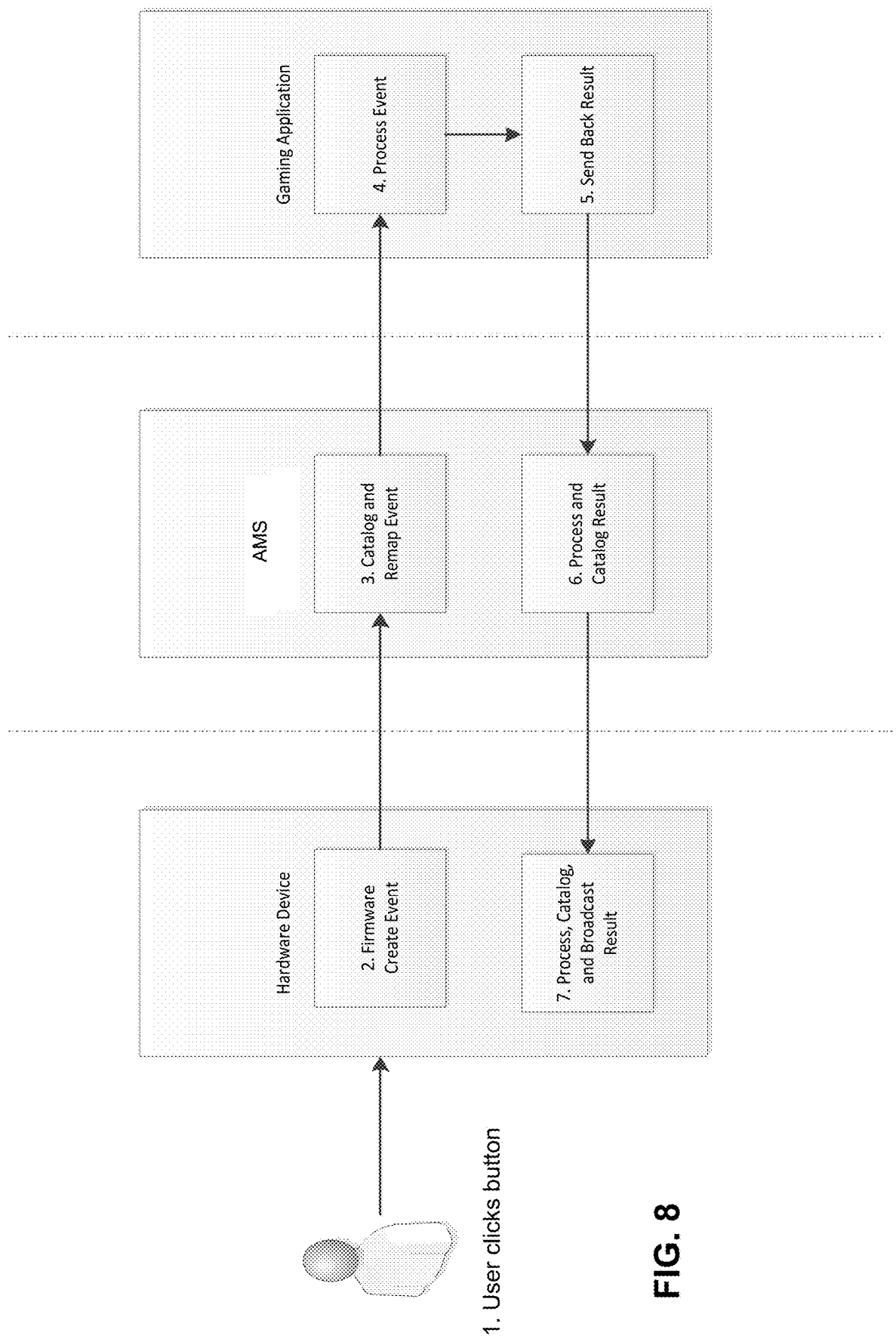
FIG. 8 depicts an illustrative embodiment of a system operating at least in part with a gaming accessory according to FIGS. 5A-5G.
Figure 9:
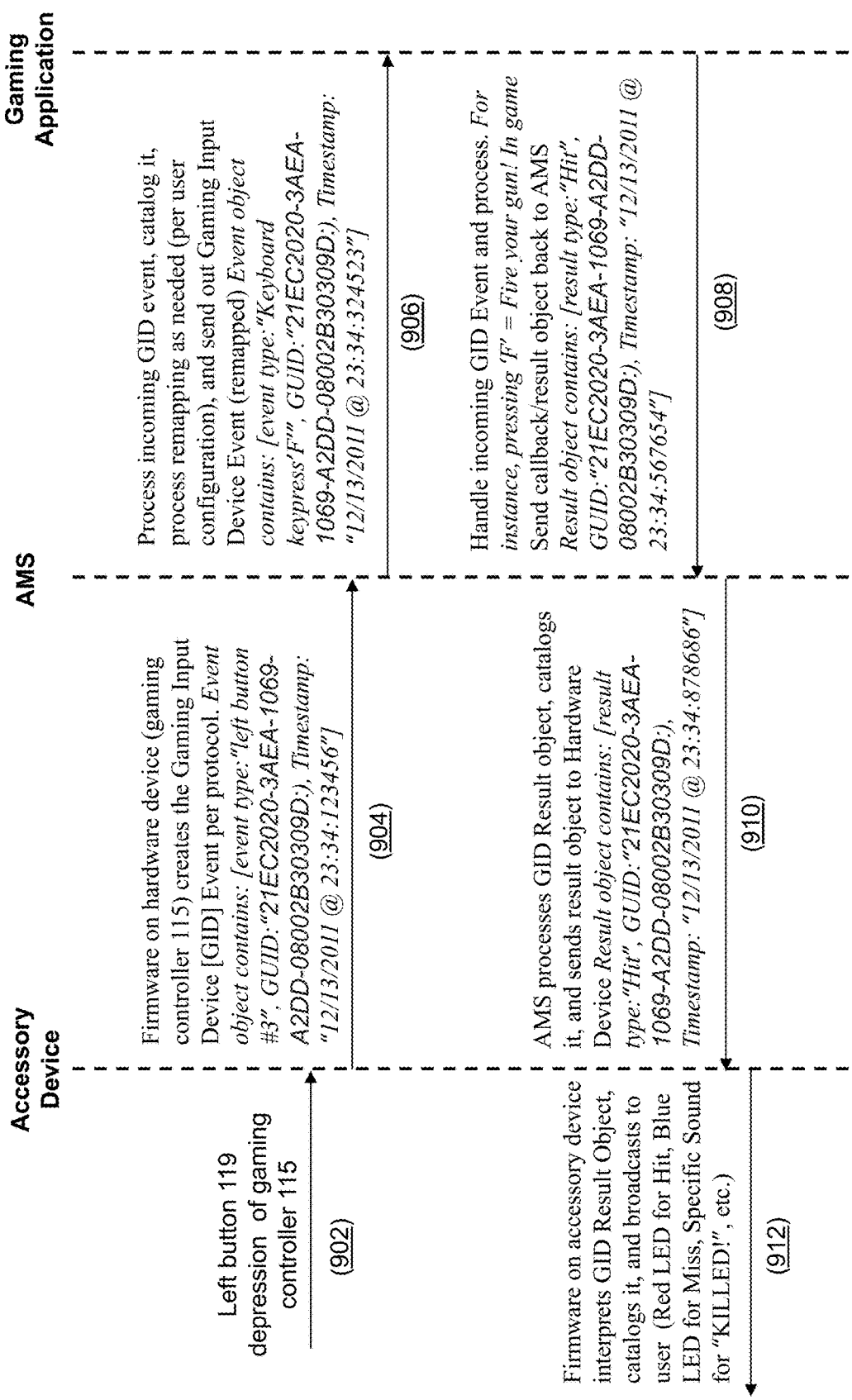
FIG. 9 depicts an illustrative embodiment of a communication flow diagram utilized by a gaming system including a gaming device according to embodiments of the disclosure.

FIGS. 8-9 illustrate embodiments of a system with a corresponding communication flow diagram for correlating stimulations and gaming action results. In this illustration a user clicks the left button 119 of the gaming controller 115. The gaming controller 115 can include firmware (or circuitry), which creates an event as depicted by event 2 in FIG. 8. The button depression and the event creation are depicted in FIG. 9 as steps 902 and 904. In step 904, the firmware of the gaming controller 115 can, for example, generate an event type "left button #3", and a unique GUID with a time stamp which is submitted to the AMS application. Referring back to FIG. 8, the AMS application catalogues event 3, and if a substitute stimulation has been predefined, remaps the event according to the substitution. The remapped event is then transmitted to the gaming application at event 4. Event 3 of FIG. 8 is depicted as step 906 in FIG. 9. In this illustration, the AMS application substitutes the left button #3 depression stimulus with a "keyboard 'F'" depression which can be interpreted by the gaming application as a fire command. The AMS application in this illustration continues to use the same GUID but substitutes the time stamp for another time stamp to identify when the substitution took place.

Referring back to event 4, the gaming application processes the event and sends back at event 5 a game action result to the AMS application which is processed by the AMS application at event 6. The AMS application then submits the results to the accessory at event 7. Events 4 and 5 are depicted as step 908 in FIG. 9. In this step, the gaming application processes "F" as an action to fire the gamer's gun, and then determines from the action the result from logistical gaming results generated by the gaming application. In the present illustration, the action of firing resulted in a hit. The gaming application submits to the AMS application the result type "Hit" with a new time stamp, while utilizing the same GUID for tracking purposes. At step 910, the AMS application correlates the stimulation "left button #3 (and/or the substitute stimulation keyboard "F") to the game result "Hit" and catalogues them in memory. The AMS application then submits to the accessory (e.g., gaming controller 115) in step 910 the game action results "Hit" with the same GUID, and a new time stamp indicating when the result was received. Upon receiving the message from the AMS application, the accessory in step 912 processes the "Hit" by asserting a red LED on the accessory (e.g., left button 119 illuminates in red or other LED of the gaming controller 115 illuminates in red) to indicate a hit. Other notification notices can be used such as another color for the LED to indicate misses, a specific sound for a hit, or kill, a vibration or other suitable technique for notifying the gamer of the game action result.

The AMS application can catalogue results as shown in FIGS. 11-14. The presentation of the catalogued results can be based on a live session, or a replay session when reviewing segments of a video game much like a replay session of a sporting event (e.g., football game) is analyzed by sports analysts. To assist the audience in viewing a competition between gamers, the AMS application can be adapted to present a virtual peripheral representative of the accessory of each gamer as shown in FIGS. 11-14.

Figure 10:
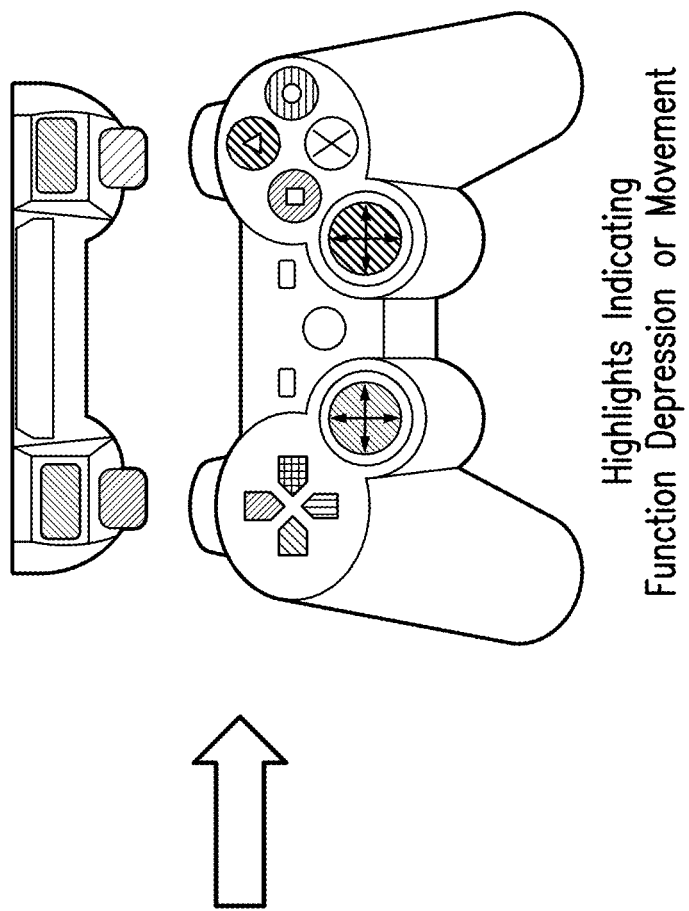
FIG. 10 depicts an illustrative embodiment for highlighting functions of a gaming accessory.
Figure 10:
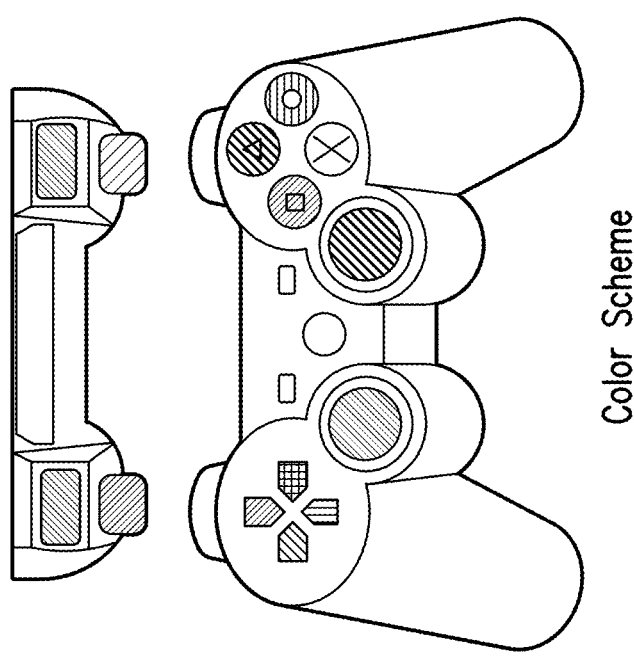

The AMS application can be adapted to use coloring and highlight schemes to indicate when a function (e.g., a button or navigation knob) of the peripheral is being used as shown in FIG. 10. For example, the color code "dark red" can represent a button or knob that is frequently in use, while a color code of "dark blue" can represent a button or knob that is infrequently used. To indicate when a button or knob is in use, the button or knob can be highlighted with a white outline while the unused buttons can remain unhighlighted. In the case of knobs, which can be moved omnidirectionally, the AMS application can show movements of a highlighted knob as the gamer is utilizing the knob based on the stimulations received by the AMS application.

For example, if a gamer moves a knob in a northwest direction, the knob is highlighted with a white outline, and the knob is shown moving in the direction chosen by the gamer. As buttons are being depressed and released rapidly, the AMS application will present rapid transitioning between the enabling and disabling of highlights to indicate the speed that the gamer is depressing and releasing the buttons. As the frequency of depressions of buttons or use of knobs increases, the AMS application will change the color code of the buttons or knobs as described above to signify frequency of use of the buttons and knobs.

In an embodiment where the AMS application receives gaming results from a gaming application via an API as described above, the communication flow diagram shown in FIG. 9 can be modified with a more comprehensive protocol that includes a weapon type being monitored, misses, non-kill hits (i.e., a hit that does not result in a kill), kill hits, and loss of life rate.

Figure 11:
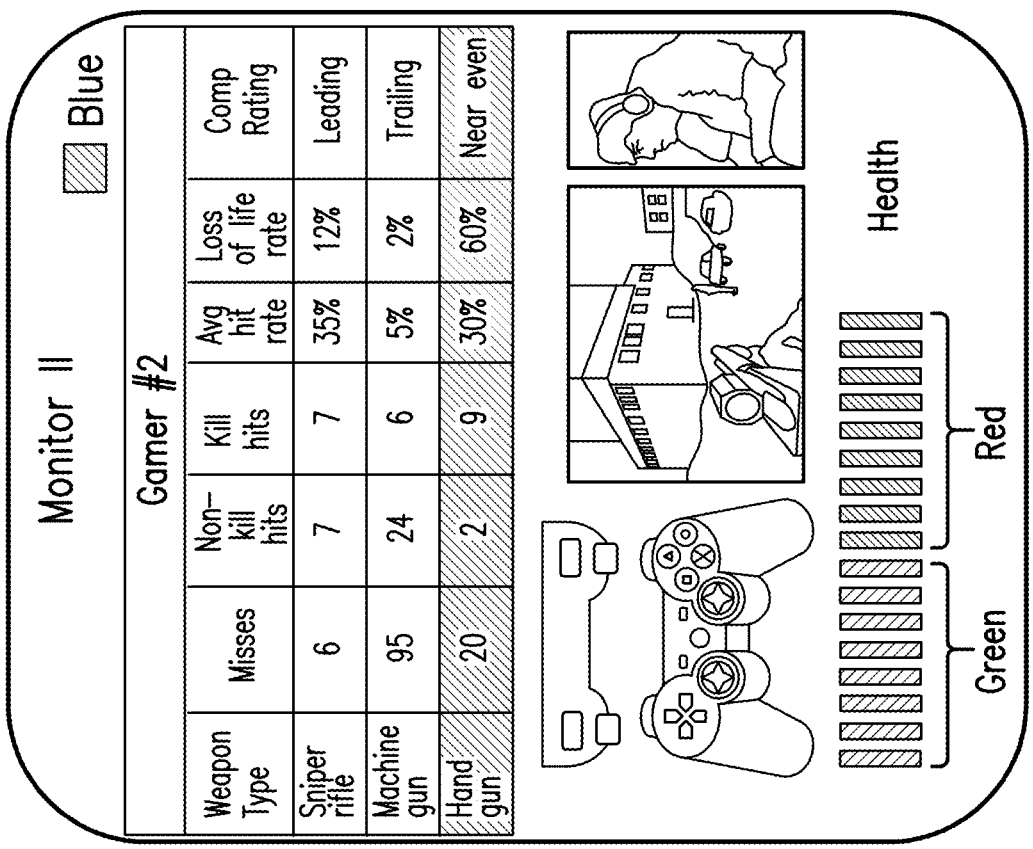
FIGS. 11-14 depict illustrative embodiments for presenting performances of gamers.
Figure 12:
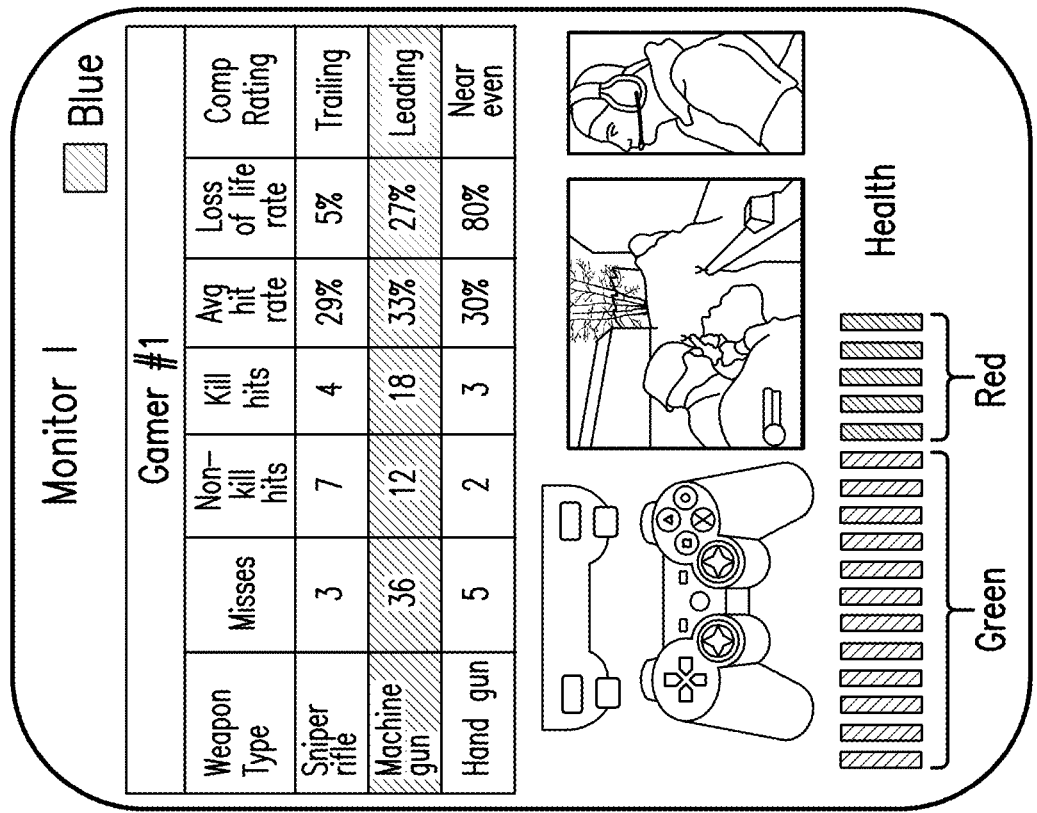

The AMS application can present performance factors of each gamer, and the type of weapons being tracked (e.g., sniper rifle, machine gun, handgun) as shown in FIGS. 11-12. To identify which weapon is being used at any point in time during a gaming session, the AMS application can highlight the weapon in a distinguishable color such as blue while keeping all other weapon rows in gray. The AMS application can calculate an average hit rate from the misses, non-kill hits, and kill hits. The AMS application can compare gaming action results between the gamers to identifying leading performance factors as shown in the "Comp Rating" column of each player. In a tournament setting, the performance factors shown in FIGS. 11 and 12 can be shown in side-by-side monitors, or together in a JumboTron™ display such as those used in sporting events or the like.

As the gamer is competing, the input functions of the gaming controller 115 can be highlighted and moved (in the case of knobs) to show the audience how the gaming controller 115 is being used by the gamer. The health of the gamer's avatar can be shown below the gaming controller 115. To further enhance the experience for the audience, the gamer's image can be shown as a video clip during the competition. The AMS application can also be adapted to present a portion of the video game associated with each gamer as shown in FIGS. 11-12.

Figure 14:
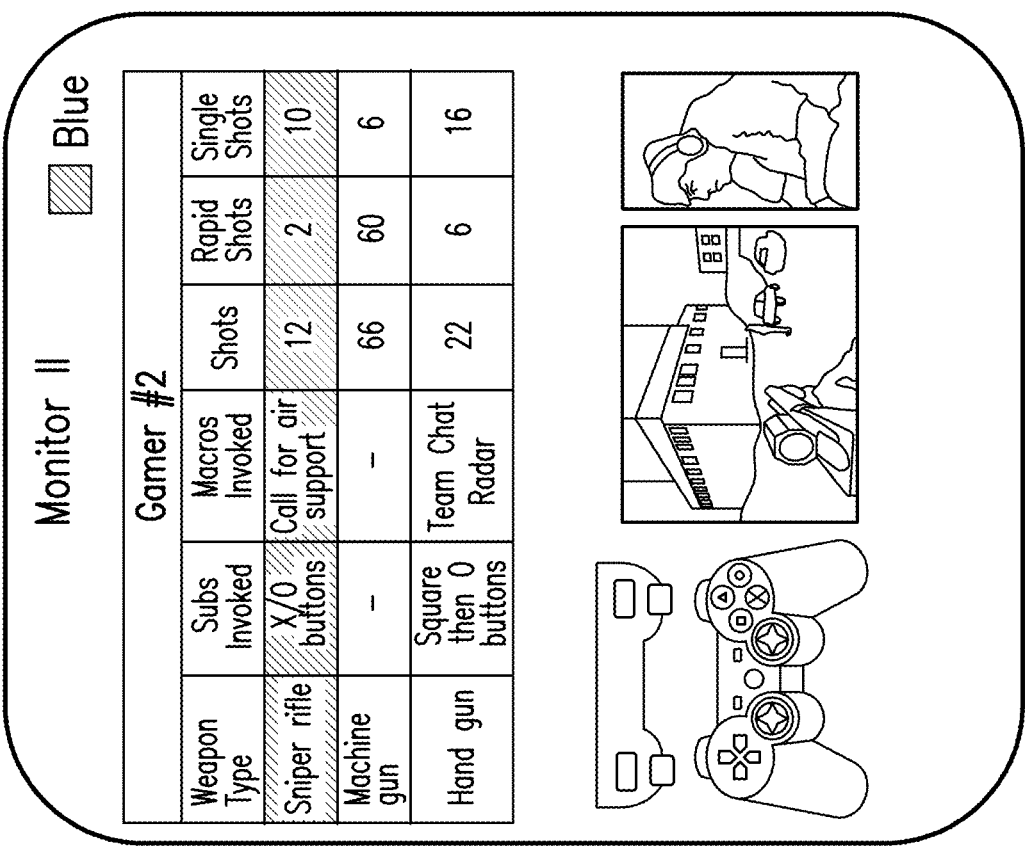
Figure 13:
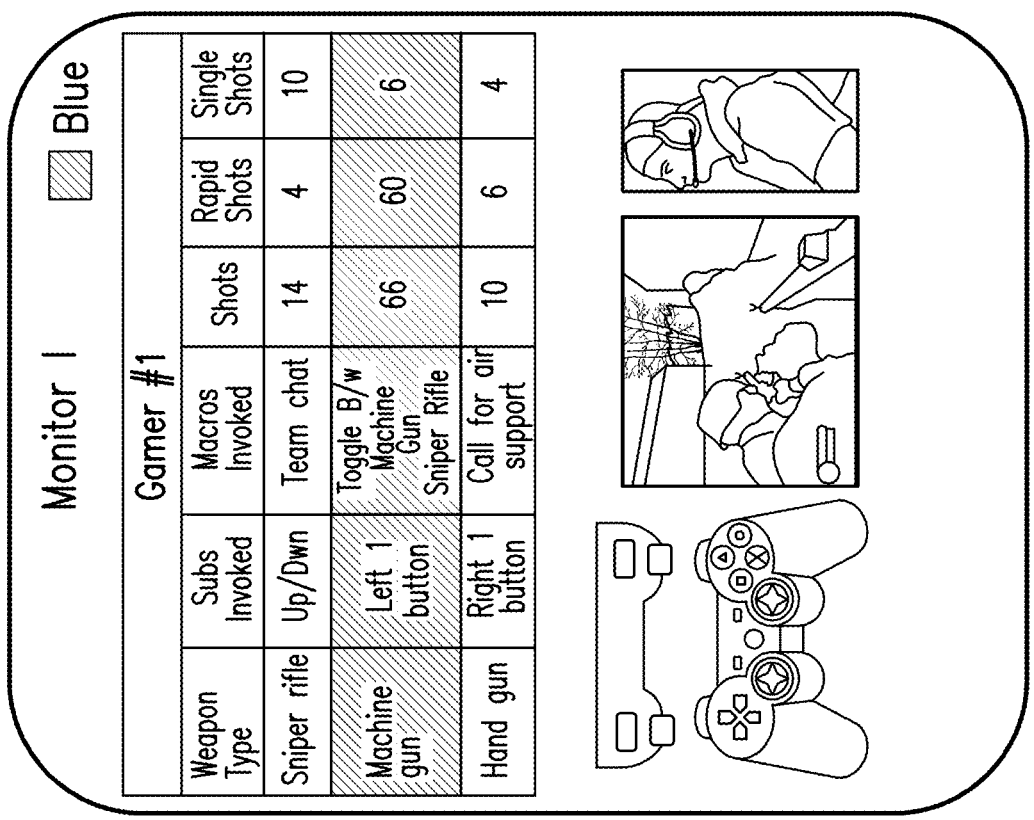

In an embodiment where the gaming application does not provide gaming action results (e.g., the video gaming application does not provide an API), the AMS application can be adapted to present a gamer's performance based on the stimulus signals generated, and where applicable, the substitute stimulus signals submitted to the gaming application as shown in FIGS. 13-14. In this illustration, the virtual peripherals are shown with the color scheme and highlights discussed earlier. The performance of the gamers can be presented according to the type of weapons used, the key depressions invoking substitutions, the macros invoked, and the rate of transmission of stimuli to the gaming application.

For example, for gamer #1, the simultaneous depression of the up and down arrows invoked the macro team chat, while using the sniper rifle. The gamer shot the rifle 14 times with 4 shots in rapid succession. Upon depressing the left "1" button of a front section of the gaming controller 115 of gamer #1, the AMS application invoked substitute stimuli transmitted to the gaming application which switches the use of the sniper rifle to the machine gun. A subsequent depression of the same button can cause a substitute stimulus generated by the AMS application to return to the sniper rifle. A depression of the right "1" button by gamer #1 resulted in substitute stimuli generated by the AMS application to call for air support. Gamer #2 shows that s/he has not invoked a substitute stimulus for the machine gun. This may be because the gamer has not pre-programmed the AMS application to associate stimuli generated by the gaming controller 115 with substitute stimuli, or because the gamer has chosen not to invoke substitute stimuli with a particular key depression (or sequence of key depressions).

Although not shown, monitoring stimuli generation and substitutes can be used to rate players' performances. For example, a gamer that tends to perform rapid fire on a machine gun without saving ammunition may be viewed as a poor game tactic. Comparing such statistics between gamers can be used to show performance lead factors between the gamers.

From the foregoing descriptions, it would be evident to an artisan with ordinary skill in the art that the aforementioned embodiments can be modified, reduced, or enhanced without departing from the scope and spirit of the claims described below.

For instance, the AMS application can record stimulus signals and/or gaming results for a game session and store this data for an extended period of time for each of a plurality of gamers. In addition, the AMS application can store multiple recorded game sessions for each gamer and can be adapted to compare a history of game sessions to assess how each gamer's performance has evolved. Each gamer's improvement or degradation detected by the AMS application over a number of gaming sessions can be reported to the gamer and/or other gamers as progression line charts, histograms, pie charts or other suitable presentation methods. The results can also be reported in a gaming tournament, on-line games, or other suitable setting in a manner similar to the illustrations of FIGS. 11-14.

The AMS application can compare a gamer's performance in a particular game to a gaming session recorded from a prior tournament for the same game or another game. Performance in the present context can mean a comparison of only stimulus signals (e.g., accessory-generated stimulus signals and/or substitute stimulus signals). This embodiment may be user-selectable (i.e., user selects stimulus analysis only) by way of a GUI presented by the AMS application, or the AMS application may apply this embodiment automatically in instances where the AMS application does not receive gaming action results from the gaming application due to a lack of an API or other suitable interface to receive gaming action results from the gaming application. Performance can also mean a comparison of only gaming action results and not stimulus signals, which can also be a user-selectable feature presented by a GUI generated by the AMS application. Performance can further represent a combination of gaming action results and stimulus signals with similar data of other recorded gaming sessions. In sum, a gamer's performance can be determined from stimulus signals (with or without substitute stimulus signals), and/or gaming action results in whole or on part monitored by the AMS application.

For any one of the foregoing embodiments, the AMS application can detect improvements or degradations in performance between a present tournament game and the previously recorded tournament game and report the results to the gamer and/or an audience of on-line gamers or a public audience at a tournament via the monitors of FIGS. 11-14. The foregoing embodiments can be applied in a private setting (i.e., only visible to the gamer) and/or a social network of gamers who share and present results via the AMS application or a social network such as FaceBook™ or another suitable social network platform.

In yet another embodiment, the AMS application can be adapted to compare a gamer's performance to another gamer's recorded performance. In a tournament setting, for example, the gamers' performance can be compared to each other based on the present gaming session or prior recorded sessions of the other gamer. In one embodiment, the AMS application can be adapted to present a GUI where it presents a list of gamers and recorded sessions from each gamer. The GUI can enable a user to select a particular gamer and a particular recorded gaming session of the selected gamer for comparison to a recorded (or live) gaming session of the user making the selection or another gamer of interest to the user (e.g., comparing the performance of two professional gamers).

It should be noted that gaming sessions recorded by the AMS application can be locally stored on a gamer's computing device (e.g., desktop computer or gaming console) or on a remote server managed by a service provider of the AMS application or by a service provider that provides "Cloud" storing services. Comparison results can similarly be stored on a gamer's local computing device or a remote server.

In yet another embodiment, the AMS application can be adapted to alert users when a particular gamer has achieved certain performance criteria established by another gamer. For instance, the AMS application can present a GUI to a gamer to identify performance criteria of interest (e.g., number of kill hits, average hit rate for a particular weapon, a particular ranking of a gamer for a particular gaming application, etc.). The identified performance criteria can be monitored by the AMS application for the selected gamer and when one or more criteria have been achieved by the monitored gamer, the AMS application can alert the interested user by suitable communication means such as email, short messaging system (SMS) text message, or a GUI of the AMS application when the interested user is engaging the AMS application.

In another embodiment, the AMS application can compare the performance of the gamers to a community rating localized to users of the gaming console 236, or all or a portion of on-line users which can span a large community of users of the gaming application. For example, although an average hit rate of 5% for a sniper rifle may seem low for gamer #1 in FIG. 11, when these statistics are compared to other members of a community (e.g., other professional players), the AMS application can determine from prior performance records of members of the community (retrieved from a local or remote database) that the user's performance is in fact above average. Similar community comparisons can be performed for the weapon type "machine gun" and "handgun". The AMS application can also monitor and track statistics of other gaming applications which may have different weapon types. Similar statistics can be generated and compared to the performance of members of a community to which the gamer is associated.

In one embodiment, the statistical results shown in FIGS. 11-14 can be used to identify behavioral and/or skill patterns of a gamer. For instance, suppose a gamer appears to perform well as a sniper in one gaming application and bow and arrow marksman in a different gaming application. The AMS application can be adapted to detect these correlations to indicate a skill set of the gamer that may be consistent between different games. For example, a sniper and bowman have a similar trait that requires marksmanship, calm nerves, and knowing when to strike. This trait can be identified by the AMS application and can be used to identify other games in which the gamer may perform well. This trait can also be advertised to other gamers to promote teams.

The above-described methods can be adapted to operate in whole or in part in a gaming accessory, in an operating system of a computer, in a gaming console, in a gaming application that generates the video game, or any other suitable software application and/or device.

In an embodiment, the AMS application can be adapted to ignore or filter game action results not considered relevant by the gamer or analysts. For instance, the AMS application can be adapted to ignore (or filter) game action results relating to navigation of the avatar (e.g., turn around, jump, etc.). The AMS application can also be adapted to ignore (or filter) game action results relating to preparatory actions such as reloading a gun, switching between weapons, and so on. In another embodiment, the AMS application can be adapted to selectively monitor only particular game result actions such as misses, non-kill hits, kills, and life of the avatar. The AMS application can also be adapted to monitor gaming action results with or without temporal data associated with the stimuli and game action results.

In one embodiment, the AMS application can be adapted to track stimuli (or substitutions thereof) by submission order, and order of gaming action results supplied by the gaming application and perform cataloguing thereof by the respective order of stimuli and gaming action results. The items can be catalogued by the AMS application with or without temporal data.

In one embodiment, the AMS application can be adapted to collect gaming action results for all or a substantial portion of stimuli (or substitutions thereof) transmitted to the gaming application. In this embodiment, the AMS application can be adapted to enable a gamer to replay portions of the game to allow the gamer to visualize (in slow motion, still shots, or regular play speed) the actions taken by the gamer (i.e., accessory stimuli and/or substitute stimuli) to help the gamer identify areas of the game where his/her performance can be improved.

In one embodiment, the AMS application can be implemented as a distributed system (e.g., one or more servers executing one or more virtual machines) enabling multiples users to control aspects of the AMS application. For example, in a tournament setting, gaming analysts having access to the AMS application can request a replay of portions of the game to demonstrate exceptional plays versus missed plays at a JumboTron™ display. The gainers can access the AMS application to establish new substitute stimuli, perform calibrations on macros, or invoke or create additional gaming profiles. Portions of the AMS application can also be implemented by equipment of unaffiliated parties or service providers of gaming services.

In one embodiment, the AMS application can be adapted to substitute an accessory stimulus (or stimuli) for a macro comprising a combination of substitute stimuli and track the macro when gaming action results are received from the gaming application rather than track each individual substitute stimulus of the macro. The AMS application can be adapted to monitor macros by tracking an order of stimuli (or substitutes) associated with the macro that are transmitted to the gaming application and by tracking an order of gaming action results received from the gaming application, which are associated with the macro. Alternatively, or in combination the AMS application can add a unique identifier to the substitute stimuli to identify the stimuli as being associated with the macro.

The AMS application can be adapted to catalogue the gaming action results associated with the macro in a manner that allows the gamer to identify a group of gaming action results as being associated with the macro. The AMS application can also be adapted to collect sufficient data to assess each individual gaming action result of the macro (e.g., temporal data, hits, misses, etc.). The presentation of catalogued macro data can be hierarchical. For example, the AMS application can present a particular macro by way of a high-level GUI that indicates the macro caused a kill. The AMS application can be adapted to enable the gamer to select a different GUI that enables the user to visualize a gaming action result for each stimulus of the macro to determine how effective the macro was in performing the kill, and whether further adjustments of the macro might improve the gamer's performance.

In one embodiment, the AMS application can be adapted to present more or less competitive information than is shown in FIGS. 11-14. In one embodiment, for example, the AMS application can be adapted to present competitive information without the virtual peripherals. In one example, the AMS application can be adapted to present scrollable pages of competitive information with or without the virtual peripherals. In another illustration, the AMS application can be adapted to present competitive information without a viewing of the game or the gamer. Other variants of presenting competitive information or other data shown in FIGS. 11-14 are contemplated by the subject disclosure.

The foregoing embodiments are a subset of possible embodiments contemplated by the subject disclosure. Other suitable modifications can be applied to the subject disclosure.

FIG. 15 depicts an exemplary diagrammatic representation of a machine in the form of a computer system 1500 within which a set of instructions, when executed, may cause the machine to perform any one or more of the methods discussed above. One or more instances of the machine can operate as any of devices depicted in FIGS. 1-3. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1500 may include a processor 1502 (e.g., a central processing unit (CPU), a graphics processing unit (GPU, or both), a main memory 1504 and a static memory 1506, which communicate with each other via a bus 1508. The computer system 1500 may further include a video display unit 1510 (e.g., a liquid crystal display (LCD), a flat panel, or a solid-state display. The computer system 1500 may include an input device 1512 (e.g., a keyboard), a cursor control device 1514 (e.g., a mouse), a disk drive unit 1516, a signal generation device 1518 (e.g., a speaker or remote control) and a network interface device 1520.

The disk drive unit 1516 may include a tangible computer-readable storage medium 1522 on which is stored one or more sets of instructions (e.g., software 1524) embodying any one or more of the methods or functions described herein, including those methods illustrated above. The instructions 1524 may also reside, completely or at least partially, within the main memory 1504, the static memory 1506, and/or within the processor 1502 during execution thereof by the computer system 1500. The main memory 1504 and the processor 1502 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, Wi-Fi, Zigbee), and long-range communications (e.g., WiMAX, GSM, CDMA, LTE) are contemplated for use by computer system 1500.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method comprising:
presenting, by a computer device, a first visual representation at a display device of an input device associated with the computer device;
receiving, by the computer device, a combined signal from a mechanical button of the input device, wherein the combined signal includes in combination together a first signal from a motion-sensitive component of the mechanical button and a second signal from a touch-sensitive interface of the mechanical button, wherein the touch-sensitive interface is associated with a plurality of regions of the mechanical button, wherein the first signal is produced responsive to a motion of the mechanical button of the input device; and
presenting, by the computer device, a second visual representation at the display device of a user interaction by a user with the mechanical button of the input device according to the combined signal, the second visual representation modified from the first visual representation to provide, to the user, visual feedback relating to the user interaction by the user with the mechanical button.

2. The method of claim 1, wherein the touch-sensitive interface of the mechanical button is responsive to user contact with the mechanical button at any of the plurality of regions of the mechanical button.

3. The method of claim 1, wherein the motion-sensitive component of the mechanical button is responsive to user actuation of the mechanical button.

4. The method of claim 1, wherein the second visual representation includes highlighting any of the plurality of regions of the mechanical button according to user contact with the mechanical button at any of the plurality of regions of the mechanical button.

5. The method of claim 4, wherein the highlighting comprises a color, an outline, or a combination thereof.

6. The method of claim 1, wherein the receiving is via a wired connection, a wireless connection, or a combination thereof.

7. The method of claim 1, further comprising providing, by the computer device, a graphical user interface at the display device, wherein a first touch sensitive region of the plurality of regions and a second touch sensitive region of the plurality of regions are defined by an image drawn by the user on the first visual representation of the input device.

8. The method of claim 1, wherein the input device generates haptic feedback in response to the user interaction with the mechanical button.

9. The method of claim 1, wherein the presenting the first visual representation and the presenting the second visual representation is used for a training procedure for the input device.

10. The method of claim 1, wherein the input device is a gaming accessory device.

11. A computer device, comprising:
a processing system including a processor; and
a memory that stores executable instructions that, when executed by the processing system, facilitate performance of operations, the operations comprising:
receiving a combined signal from a mechanical button of an input device associated with the computer device, wherein the combined signal includes in combination together a first signal produced responsive to a motion of a motion-sensitive component of the mechanical button and a second signal from a touch-sensitive interface of the mechanical button, wherein the touch-sensitive interface is associated with a plurality of regions of the mechanical button; and
presenting, based on the combined signal, a first visual representation at a display device of a user interaction by a user with the mechanical button of the input device, the first visual representation providing, to the user, visual feedback relating to the user interaction by the user with the mechanical button of the input device.

12. The computer device of claim 11, wherein the operations further comprise presenting a second visual representation at the display device of the input device associated with the computer device.

13. The computer device of claim 11, wherein the touch-sensitive interface of the mechanical button is responsive to user contact with the mechanical button at any of the plurality of regions of the mechanical button.

14. The computer device of claim 11, wherein the motion-sensitive component of the mechanical button is responsive to user actuation of the mechanical button.

15. The computer device of claim 11, wherein the first visual representation includes highlighting any of the plurality of regions of the mechanical button according to user contact with the mechanical button at any of the plurality of regions of the mechanical button.

16. The computer device of claim 15, wherein the highlighting comprises a color, an outline, or a combination thereof.

17. A non-transitory, computer-readable storage medium, comprising instructions that, when executed by a processor at a computer device, facilitate performance of operations comprising:
receiving a combined signal from a mechanical button of an input device associated with the computer device, wherein the combined signal includes in combination together a first signal indicative of a mechanical actuation of a motion-sensitive component of the mechanical button and a second signal from a touch-sensitive interface of the mechanical button; and
presenting, in response to the combined signal, a first visual representation at a display device of a user interaction by a user with the mechanical button of the input device, the first visual representation operative to provide visual feedback to the user relating to the user interaction by the user with the mechanical button of the input device.

18. The non-transitory, computer-readable storage medium of claim 17, wherein the touch-sensitive interface is associated with a plurality of regions of the mechanical button.

19. The non-transitory, computer-readable storage medium of claim 18, wherein the first visual representation includes highlighting any of the plurality of regions of the mechanical button according to user contact with the mechanical button at any of the plurality of regions of the mechanical button.

20. The non-transitory, computer-readable storage medium of claim 17, wherein the operations further comprise presenting a second visual representation at the display device of the input device associated with the computer device.

* * * * *